United States Patent
Fukui et al.

(10) Patent No.: US 8,942,198 B2
(45) Date of Patent: *Jan. 27, 2015

(54) CHANNEL ALLOCATION NOTIFYING METHOD, COMMUNICATION METHOD, AND COMMUNICATION APPARATUS

(75) Inventors: Noriyuki Fukui, Tokyo (JP); Shigenori Tani, Tokyo (JP); Fumio Ishizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 13/441,591

(22) Filed: Apr. 6, 2012

(65) Prior Publication Data

US 2012/0202547 A1 Aug. 9, 2012

Related U.S. Application Data

(62) Division of application No. 12/377,865, filed as application No. PCT/JP2007/065660 on Aug. 9, 2007, now Pat. No. 8,165,082.

(30) Foreign Application Priority Data

Sep. 29, 2006 (JP) ................................. 2006-268215
Mar. 27, 2007 (JP) ................................. 2007-082221

(51) Int. Cl.
*H04W 4/00* (2009.01)
*H04W 72/08* (2009.01)
*H04W 72/04* (2009.01)

(52) U.S. Cl.
CPC .......... *H04W 72/085* (2013.01); *H04W 72/042* (2013.01)
USPC ........... 370/329; 370/341; 370/437; 709/225; 455/450; 455/464; 455/509

(58) Field of Classification Search
USPC ........................... 455/513; 370/330, 329, 208
See application file for complete search history.

(56) References Cited

U.S. PATENT DOCUMENTS 5,493,695 A * 2/1996 Aitkenhead et al. .......... 455/509
5,898,928 A * 4/1999 Karlsson et al. ............... 455/450

(Continued)

FOREIGN PATENT DOCUMENTS

EP  1 388 224 B1  2/2004
JP  2002 300168   10/2002

(Continued)

OTHER PUBLICATIONS

Office Action issued Dec. 21, 2010, in Japan Patent Application No. 2008-537429 (with English-language Translation).

(Continued)

*Primary Examiner* — Yuwen Pan
*Assistant Examiner* — Raj Chakraborty
(74) *Attorney, Agent, or Firm* — Oblon, Spivak, McClelland, Maier & Neustadt, L.L.P.

(57) ABSTRACT

The number of communication channels necessary for communication with a terminal is calculated by using type and volume of data to be transmitted. When calculated number of communication channels is one, a single communication channel is allocated based on quality information of a communication line to the terminal and, when calculated number of communication channels is more than one, then more than one communication channels are allocated based on the quality information. Allocation information used for notifying of allocated communication channels is generated based on virtual channels, which are defined in advance as channel units having a combination of a plurality of consecutive communication channels, and the allocation information is transmitted to the terminal.

12 Claims, 11 Drawing Sheets

(56) References Cited

U.S. PATENT DOCUMENTS

| | | | |
|---|---|---|---|
| 6,097,704 A * | 8/2000 | Jackson et al. | 370/280 |
| 6,564,060 B1 | 5/2003 | Hoagland | |
| 6,826,408 B1 | 11/2004 | Kim et al. | |
| 7,385,943 B2 * | 6/2008 | Niddam | 370/321 |
| 7,894,391 B2 * | 2/2011 | Kwon et al. | 370/329 |
| 2002/0167728 A1 | 11/2002 | Ohmori | |
| 2003/0021245 A1 * | 1/2003 | Haumonte et al. | 370/330 |
| 2004/0081127 A1 * | 4/2004 | Gardner et al. | 370/338 |
| 2004/0258038 A1 * | 12/2004 | Beard et al. | 370/348 |
| 2005/0141451 A1 | 6/2005 | Yoon et al. | |
| 2005/0201269 A1 * | 9/2005 | Shim et al. | 370/208 |
| 2007/0060160 A1 | 3/2007 | Hur et al. | |
| 2007/0189214 A1 * | 8/2007 | Hyon et al. | 370/329 |
| 2008/0020778 A1 * | 1/2008 | Pi | 455/450 |
| 2009/0034467 A1 * | 2/2009 | Chakraborty et al. | 370/330 |
| 2010/0323708 A1 * | 12/2010 | Kozat | 455/450 |
| 2011/0064045 A1 * | 3/2011 | Chakraborty et al. | 370/330 |

FOREIGN PATENT DOCUMENTS

| | | |
|---|---|---|
| JP | 2003-244753 | 8/2003 |
| JP | 2004 530379 | 9/2004 |
| JP | 2005 244495 | 9/2005 |
| WO | 2005 043794 | 5/2005 |
| WO | WO 2006/036048 A2 | 4/2006 |
| WO | WO 2006/098993 A1 | 9/2006 |

OTHER PUBLICATIONS

Extended European Search Report issued Aug. 18, 2011, in Patent Application No. 07805921.9.

Technical Specification Group Radio Access Network; Physical layer aspects for evolved Universal Terrestrial Radio Access (UTRA), $3^{rd}$ Generation Partnership Project, 3GPP TR 25.814, vol. 7.0.0, XP 3020297, Jun. 2006, 19 pages (pp. 1-11 previously submitted on Feb. 18, 2009).

"Resource Allocation Signaling for E-UTRA", NEC Group, vol. R1-061308, XP 50102186, May 8-12, 2006, pp. 1-11.

"Signaling Way of Resource Assignment", Mitsubishi Electric, vol. R1-062542, XP 50103062, Oct. 9-13, 2006, pp. 1-5.

"Further Study of Resource Allocation in Downlink" Mitsubishi Electric, vol. R1-074552, XP 50108047, Nov. 5-9, 2007, pp. 1-8.

"Signaling Resource Allocations in DL Control Channel", Alcatel-Lucent, vol. R1-071626, XP 50105553, Mar. 26-30, 2007, pp. 1-10.

"$3^{rd}$ Generation Partnership Project; Technical Specification Group Raido Access Network; Physical Layer Aspects for Evolved Universal Terrestrial Radio Access (UTRA)(Release 7)", 3GPP TR 25.814 V7.0.0, pp. 1-7 and 28-31 (2006).

"E-UTRA Downlink Control Signaling—Overhead Assesment", Ericsson, NTT DoCoMo (2006) R1-060573.

"DL Unicast Resource Allocation Signalling", NEC Group, pp. 104 (2007) R1-071507.

"E-UTRA DL L1/L2 Control Channel Information & RA Map Reduction", Motorola (2007) R1-070036.

* cited by examiner

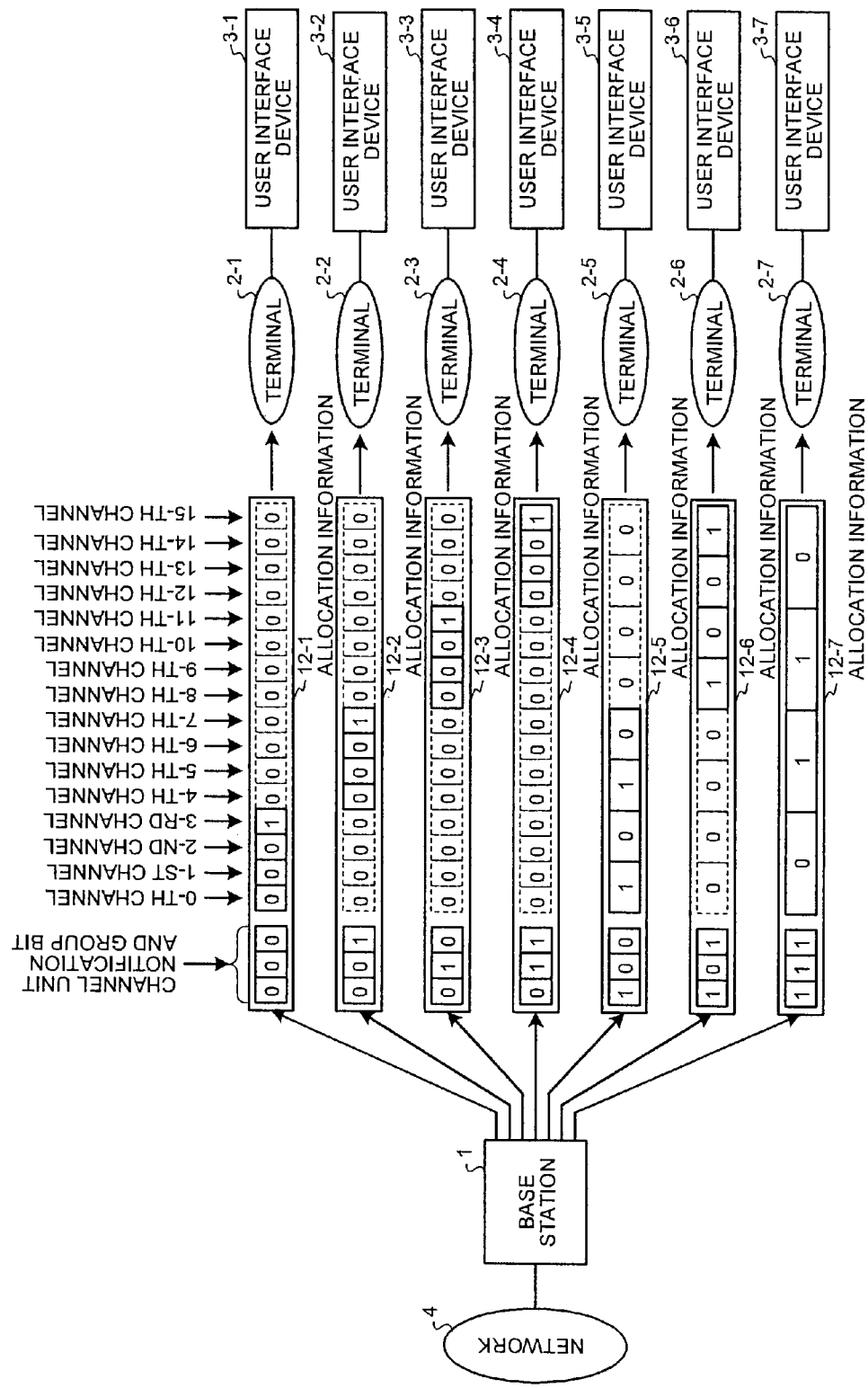

US 8,942,198 B2

CHANNEL ALLOCATION NOTIFYING METHOD, COMMUNICATION METHOD, AND COMMUNICATION APPARATUS

CROSS-REFERENCE TO RELATED APPLICATIONS

This application is a divisional application of, and claims the benefit of priority under 35 U.S.C. §120 from, U.S. application Ser. No. 12/377,865, filed Feb. 18, 2009, herein incorporated by reference, which is a National Stage Application of International Application No. PCT/JP2007/065660, filed Aug. 9, 2007, and which claims the benefit of priority under 35 U.S.C. §119 from Japanese Patent Application Nos. 2006-268215, filed Sep. 29, 2006 and 2007-082221, filed Mar. 27, 2007.

TECHNICAL FIELD

The present invention relates to a channel allocation notifying method in a communication system in which communication is performed by using a plurality of communication channels, and more particularly, to a channel notifying method when allocating a plurality of communication channels to a single terminal.

BACKGROUND ART

Currently, under the name of LTE (Long Term Evolution), the 3GPP (3rd Generation Partnership Project) has undertaken a study of a wireless system with a new wireless technology. In that wireless technology, a plurality of communication channels are defined on a frequency axis and, depending on the communication quality, the communication channels are allocated to terminals for communication purpose. A control channel is used to notify each terminal of channel information regarding allocated communication channels prior to actual data transmission. In Nonpatent Literature 1 mentioned below, downlink channel allocation information is described in Table 7.1.1.2.3.1-1 of Chapter 7.1.1.2.3.1, while uplink channel allocation information is described in Table 7.1.1.2.3.2-1 of Chapter 7.1.1.2.3.2 as part of control information (Resource assignment).

Although it is possible to allocate a plurality of communication channels to a single terminal in the wireless system, the 3GPP is yet to make a decision about the method of notifying channel allocation. For example, in Nonpatent Literature 2 mentioned below, a method of notifying channel allocation with the use of bitmaps is described in the upper portion of FIG. 1. That method is described with reference to FIG. 11. In FIG. 11, a channel allocating station 101 allocates communication channels to terminals 102-1, 102-2, and 102-3. Control information 103-1, 103-2, and 103-3 is channel allocation information transmitted to the terminals 102-1, 102-2, and 102-3, respectively.

The channel allocating station 101 performs channel allocation and transmits channel information to each of the terminals 102-1, 102-2, and 102-3 by using a control channel. According to a bit map method described in Nonpatent Literature 2 mentioned below, the channel allocating station 101 assigns "1" only to the bits that correspond to allocated communication channels and "0" to the remaining bits, and transmits the channel information. Subsequently, each of the terminals 102 determines whether a communication channel corresponding to a bit having "1" in the corresponding channel information is the communication channel allocated thereto. Although not shown in FIG. 11, in practice, the control information corresponding to each terminal includes a terminal number. Thus, by detecting the corresponding terminal number, each terminal can determine the control information intended for itself.

Nonpatent Literature 1: 3GPP, "TR25.814 V7.0.0", 2006
Nonpatent Literature 2: 3GPP, "R1-060573", 2006

DISCLOSURE OF INVENTION

Problem to be Solved by the Invention

However, in the abovementioned conventional technology, bit count of the control information can be maintained at low level only if the number of communication channels is small. However, in a real system having a large number of channels, the bit count of the control information also increases. Meanwhile, the number of channels shown in FIG. 11 is six. In a wireless system having N number of communication channels and M number of terminals to which channel information is transmitted simultaneously, a channel allocating station sends control information that includes at least N×M bits. Thus, a large number of communication channels or terminals results in an increase in the volume of information carried by the control channel. In a wireless system with limited communication resources, large volume of information can weigh heavily on the communication channels.

Currently, the size of a single communication channel defined in the 3GPP is based on a VoIP (Voice over Internet Protocol) communication packet or a TCP-ACK packet in which a small volume of information is transmittable at once. On the other hand, by sending a large volume of information in a short period of time with the use of streaming transmission or WWW (World Wide Web), it is possible to allocate a plurality of communication channels to a single terminal. In such a case, if the allocated communication channels happen to be consecutive communication channels, then a continuous range of consecutive communication channels can be specified to reduce the volume of the channel allocation information. However, if the channel allocation information is generated based on the bit map method of one bit per communication channel, then, irrespective of whether the allocated communication channels are consecutive communication channels, it is not possible to reduce the volume of the channel allocation information.

The present invention has been made to solve the above problems in the conventional technology and it is an object of the present invention to provide a method of notifying channel allocation by which the volume of channel allocation information transmitted to the terminals is decreased.

Means for Solving Problem

To solve the above problems and to achieve the object, a channel allocation notifying method according to the present invention is for a communication apparatus in a communication system to allocate a communication channel to a terminal belonging to the communication apparatus and notify the communication channel to the terminal. The channel allocation notifying method includes a number-of-channel calculating step of calculating number of communication channels necessary for a communication with the terminal by using type and volume of data to be transmitted; a channel allocating step including allocating a single communication channel to the terminal based on quality information of a communication line between the communication apparatus and the terminal when calculated number of communication channels is one, and allocating more than one communication channels to the terminal based on the quality information when the calculated number of communication channels is more than one; and an allocation information generating step including generating allocation information for notifying an allocated communication channel to the terminal based on a virtual channel that is set in advance as a unit of channel by combining a plurality of consecutive communication channels, and transmitting the allocation information to the terminal.

Effect of the Invention

According to the present invention, a virtual channel is defined by combining a plurality of consecutive communication channels and allocation information is notified by using the virtual channel. That enables reduction in the volume of channel allocation information transmitted to a terminal.

BRIEF DESCRIPTION OF DRAWINGS

FIG. 12 is a diagram of an exemplary configuration of a communication system according to a seventh embodiment.

EXPLANATIONS OF LETTERS OR NUMERALS 1 base station
2-1, 2-2, 2-3, 2-4, 2-5, 2-6, 2-7 terminal
3-1, 3-2, 3-3, 3-4, 3-5, 3-6, 3-7 user interface device
4 network
5-1, 5-2, 5-3, 6-1, 6-2, 6-3, 7-1, 7-2, 7-3, 8-1, 8-2, 8-3, 9-1, 9-2, 9-3, 9-4, 9-5, 10-1, 10-2, 10-3, 12-1, 12-2, 12-3, 12-4, 12-5, 12-6, 12-7 allocation information

BEST MODE(S) FOR CARRYING OUT THE INVENTION

Exemplary embodiments for a method of notifying channel allocation, a method of communication, and a communication apparatus according to the present invention will be described below in detail with reference to the accompanying drawings. The present invention is not limited to the embodiments described below.

First Embodiment

Figure 1:
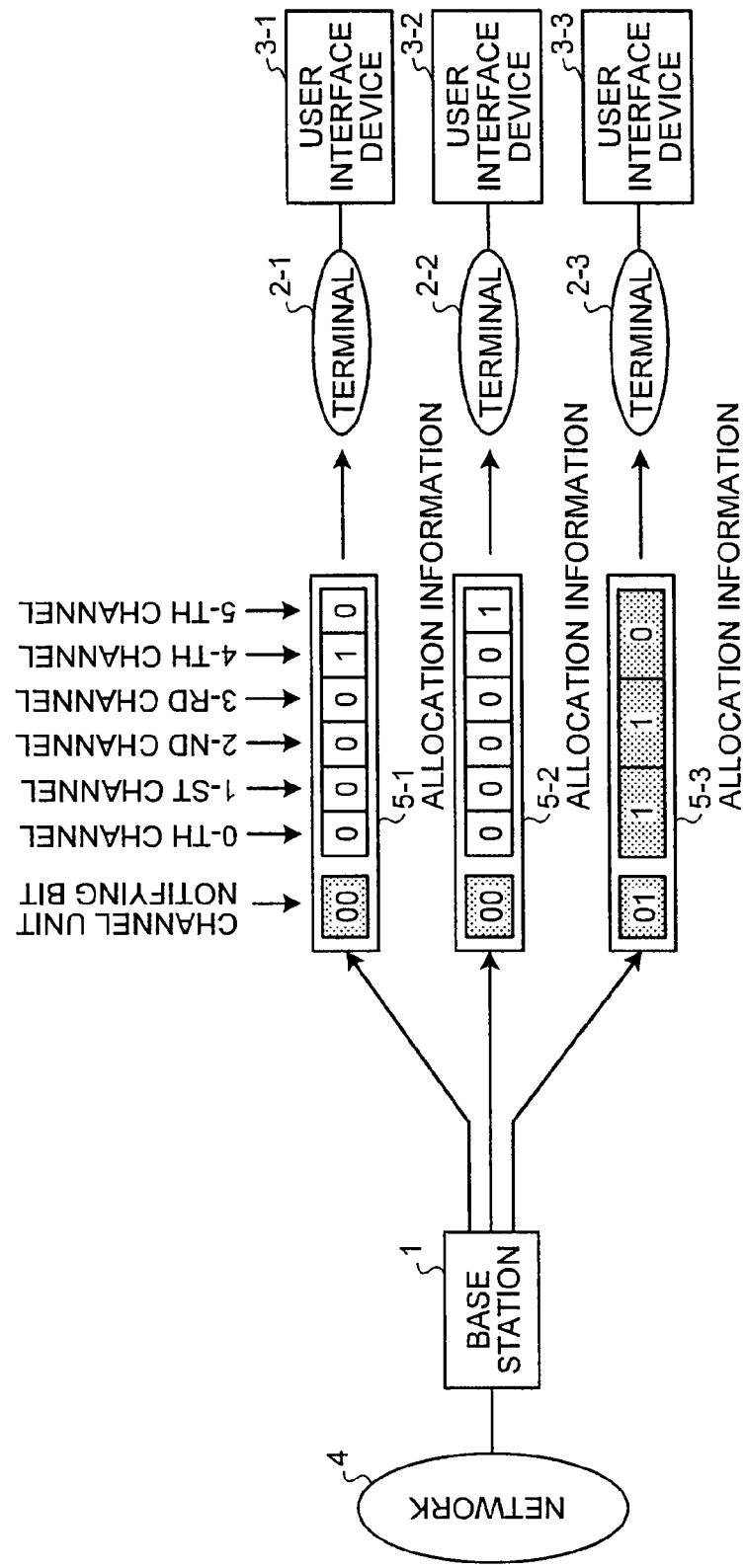
FIG. 1 is a diagram of an exemplary configuration of a communication system according to a first embodiment.

FIG. 1 is a diagram of an exemplary configuration of a communication system according to a first embodiment of the present invention. In the first embodiment, a base station 1 is described as an exemplary communication apparatus. As shown in FIG. 1, the communication system according to the first embodiment includes the base station 1, terminals 2-1, 2-2, and 2-3, and user interface devices 3-1, 3-2, and 3-3. The base station 1 performs channel allocation for the terminals 2-1, 2-2, and 2-3, which are wireless terminals. The user interface devices 3-1, 3-2, and 3-3 are connected to the terminals 2-1, 2-2, and 2-3, respectively, and generate transmission data upon receiving user operations and convert received data into a usable form such as audio data or image data. A network 4 connects the base station 1 to other base stations or the like. The data intended for the terminals 2-1, 2-2, and 2-3 is transmitted to the base station 1 via the network 4. On the other hand, the data transmitted by any one of the terminals 2-1, 2-2, and 2-3 to a destination is first sent to the network 4 via the base station 1 and then transmitted to the destination. Allocation information 5-1, 5-2, and 5-3 is channel allocation information transmitted by the base station 1 to the terminals 2-1, 2-2, and 2-3, respectively. In the communication system according to the first embodiment, six communication channels from the 0-th communication channel to the 5-th communication channel are available for communication. The base station 1 selects and allocates communication channels from the six communication channels to each of the terminals 2-1, 2-2, and 2-3.

Figure 2:
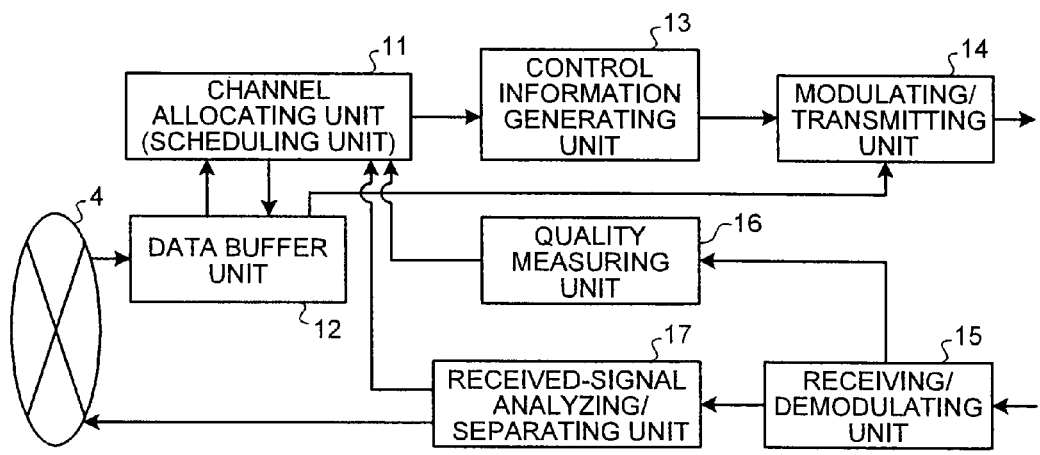
FIG. 2 is a diagram of an exemplary functional configuration of a base station according to the first embodiment.

FIG. 2 is a diagram of an exemplary functional configuration of the base station 1. As shown in FIG. 2, the base station 1 includes a channel allocating unit 11 that performs channel allocation (scheduling) for terminals, a data buffer unit 12 in which data received from a network is stored, a control information generating unit 13 that generates control information including channel allocation information, a modulating/transmitting unit 14 that modulates and transmits the control information generated by the control information generating unit 13 as well as the data stored in the data buffer unit 12, a receiving/demodulating unit 15 that receives data from a terminal and demodulates the data, a quality measuring unit 16 that measures quality of each uplink communication channel by using received data, and a received-signal analyzing/separating unit 17 that analyses the demodulated data, separates data portion from the demodulated data, and delivers the data portion to the network.

Figure 3:
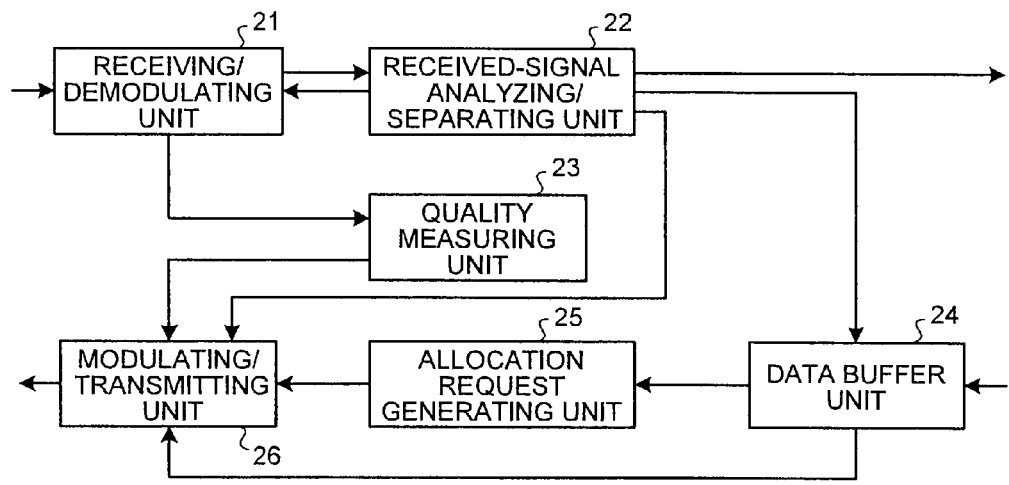
FIG. 3 is a diagram of an exemplary functional configuration of a terminal according to the first embodiment.

FIG. 3 is a diagram of an exemplary functional configuration of each of the terminals 2-1, 2-2, and 2-3. As shown in FIG. 3, a terminal according to the first embodiment includes a receiving/demodulating unit 21 that receives data from the base station 1 and demodulates the data, a received-signal analyzing/separating unit 22 that analyses the demodulated data, separates data portion from the demodulated data, and delivers the data portion to the corresponding user interface device from among the user interface devices 3-1, 3-2, and 3-3, a quality measuring unit 23 that measures quality of each downlink communication channel by using received signals, a data buffer unit 24 in which data received from the corresponding user interface device from among the user interface devices 3-1, 3-2, and 3-3 is stored, an allocation request generating unit 25 that, when the data is stored in the data buffer unit 24, generates a channel allocation request, and a modulating/transmitting unit 26 that modulates and transmits the channel allocation request generated by the allocation request generating unit 25, the data stored in the data buffer unit 24, and quality information measured by the quality measuring unit 23.

Given below is the description with reference to FIG. 1 of the allocation information 5-1, 5-2, and 5-3 used for notifying channel allocation according to the first embodiment. As shown in FIG. 1, features according to the first embodiment are appending a channel unit notifying bit and combining two or more communication channels to form virtual channel units. A virtual channel unit is formed by combining consecutive communication channels and is treated in entirety as a single communication channel.

Generally, consecutive communication channels are correlated with each other and have a resemblance in quality. Thus, if the quality of a communication channel is favorable to a particular terminal, then it is highly likely that the quality of corresponding consecutive communication channels is also favorable to that terminal. Naturally, when a plurality of communication channels is allocated to a single terminal, it is likely that the channels are arranged consecutively. In such a case, if two or more consecutive communication channels are combinedly represented as a single virtual channel unit, then it becomes possible to reduce the bit count required for the channel allocation information as compared to the conventional bit map method.

In the following description, the number of communication channels combined to form a virtual channel unit is referred to as an order of the virtual channel unit. A single communication channel not subjected to combination with consecutive communication channels is referred to as a channel of first order, a virtual channel unit formed by combining two communication channels is referred to as a virtual channel of second order, and a virtual channel unit formed by combining three communication channels is referred to as a virtual channel of third order.

More particularly, three virtual channel units formed by combining the 0-th communication channel and the 1-st communication channel, the 2-nd communication channel and the 3-rd communication channel, and the 4-th communication channel and the 5-th communication channel, respectively, are considered as the virtual channels of second order. Similarly, two virtual channel units formed by combining the 0-th communication channel, the 1-st communication channel, and the 2-nd communication channel, and by combining the 3-rd communication channel, the 4-th communication channel, and the 5-th communication channel are considered as the as virtual channels of third order. According to the first embodiment, the third order is assumed to the highest order for a virtual channel unit. However, the highest order can be appropriately determined depending on data type of provided service (since allocation of communication channels to a terminal depends on the data type), or change characteristics of the wireless communication path, or number of communication channels available in the communication system. When the number of available communication channels is not divisible by the order of the virtual channel units, the remaining single channels can be treated as the channels of first order. For example, when virtual channels of second order are used to notify seven available communication channels, then one channel remains undefined as part of a virtual channel unit. In that case, it is possible to determine, in advance, which one of the seven communication channels is to be notified as the channel of first order such that the other communication channels can be used to define the virtual channels of second order.

In FIG. 1, the leftmost bit shown in each of the allocation information 5-1, 5-2, and 5-3 is a channel unit notifying bit that indicates the order used for notifying the channel allocation information of six bits that are arranged subsequent to the channel unit notifying bit and that correspond to the six communication channels (hereinafter, "channel bits"). For example, according to the first embodiment, a channel unit notifying bit "00" indicates that the channel allocation information is notified with the channel of first order, a channel unit notifying bit "01" indicates that the channel allocation information is notified with the virtual channels of second order, and a channel unit notifying bit "10" indicates that the channel allocation information is notified with the virtual channels of third order. As in the case of the conventional bit map method, "1" is assigned to the channel bits that correspond to the allocated communication channels and "0" is assigned to the channel bits that do not correspond to the allocated communication channels.

In the example shown in FIG. 1, only the 4-th communication channel is allocated to the terminal 2-1, only the 5-th communication channel is allocated to the terminal 2-2, and four channels from the 0-th communication channel to the 3-rd communication channel are allocated to the terminal 2-3. Thus, the allocation information 5-1 and 5-2 is notified with the channel of first order and the corresponding channel unit notifying bits are set to "00". In the case of the allocation information 5-1, "1" is assigned to the channel bit corresponding to the 4-th communication channel and "0" is assigned to the remaining channel bits. In the case of the allocation information 5-2, "1" is assigned to the channel bit corresponding to the 5-th communication channel and "0" is assigned to the remaining channel bits.

On the other hand, in the case of the allocation information 5-3, the four consecutive communication channels are combined to form two virtual channels of second order. Thus, the corresponding channel unit notifying bit is set to "01". Moreover, "1" is assigned to the channel bit corresponding to the combination of the 0-th communication channel and the 1-st communication channel as well as to the channel bit corresponding to the combination of the 2-nd communication channel and the 3-rd communication channel, while "0" is assigned to the channel bit corresponding to the combination of the 4-th communication channel and the 5-th communication channel.

According to the first embodiment, the combinations of communication channels defined for virtual channels of a particular order are fixed. For example, consider a case when two consecutive communication channels, namely, the 1-st communication channel and the 2-nd communication channel are allocated to a terminal. However, that combination is different than the combinations defined for the virtual channels of second order (i.e., the combination of the 0-th communication channel and the 1-st communication channel, the combination of the 2-nd communication channel and the 3-rd communication channel, and the combination of the 4-th communication channel and the 5-th communication channel). As a result, it is not possible to notify the combination of the 1-st communication channel and the 2-nd communication channel as a virtual channel of second order. Thus, the 1-st communication channel as well as the 2-nd communication channel is notified as a channel of first order and the corresponding channel unit notifying bit is set to "00". Moreover, "1" is assigned to the channel bits corresponding to the 1-st communication channel and the 2-nd communication channel, while "0" is assigned to the channel bits corresponding to the remaining communication channels.

According to the first embodiment, the combinations of communication channels defined for virtual channels of a particular order are fixed. Thus, if channel bits are allocated to a particular terminal under a rule that channel allocation information is notified with virtual channels of highest possible order, then the allocation information 5-1, 5-2, and 5-3 (i.e., the corresponding channel unit notifying bits and the corresponding channel bits) gets uniquely determined.

Given below is the description of a method of generating the allocation information 5-1, 5-2, and 5-3 after channel allocation is complete. First, the number of allocated communication channels is obtained. In the case of allocating only one communication channel, a channel of first order is used and the channel unit notifying bit is set to "00". Moreover, the number of channel bits is set to six, among which "1" is assigned only to the channel bit corresponding to the allocated channel and "0" is assigned to the remaining channel bits. In the case of allocating two communication channels, it is determined whether the two channels match with any one of the three fixed combinations of communication channels defined for the virtual channels of second order (i.e., the combination of the 0-th communication channel and the 1-st communication channel, the combination of the 2-nd communication channel and the 3-rd communication channel, and the combination of the 4-th communication channel and the 5-th communication channel). If the two channels match with any one of the combinations, then the channel unit notifying bit is set to "01" indicating that a virtual channel of second order is used. Moreover, the number of channel bits is set to three; among which "1" is assigned only to the channel bit corresponding to the allocated virtual channel of second order and "0" is assigned to the remaining channel bits.

In the case of allocating three communication channels, it is determined whether the combination of communication channels can be defined as a virtual channel of third order. If the combination of communication channels can be defined as a virtual channel of third order, then it is determined whether the three communication channels match with any one of the two fixed combinations of communication channels defined for the virtual channels of third order (i.e., the combination of the 0-th communication channel, the 1-st communication channel, and the 2-nd communication channel, and the combination of the 3-rd communication channel, the 4-th communication channel, and the 5-th communication channel). If the three channels match with any one of the combinations, then the channel unit notifying bit is set to "11" indicating that a virtual channel of third order is used. Moreover, the number of channel bits is set to two; among which "1" is assigned to the channel bit corresponding to the allocated channel unit and "0" is assigned to the other channel bit.

In the case of allocating four communication channels, two virtual channels of second order are used. In that case, the method of generating the allocation information is identical to the case of allocating two communication channels. In the case of allocating five communication channels, the channels of first order are used. Thus, "1" is assigned to the five channel bits corresponding to the allocated communication channels. In that case, the method of generating the allocation information is identical to the case of allocating only one communication channel. In the case of allocating six communication channels, two virtual channels of third order are used and the channel unit notifying bit is set to "11". The number of channel bits is set to two and "1" is assigned to each of those channel bits.

Meanwhile, the method of generating allocation information is not limited to the above description. That is, as described above, bit allocation (i.e., allocation of communication channels) and information of bit allocation has unique correspondence. Thus, e.g., the correspondence between bit allocation and the allocation information 5-1, 5-2, and 5-3 can be maintained by using a table or the like.

Although, according to the first embodiment, a maximum of six communication channels are available, the number of communication channels is not limited to six. Even if the number of communication channels is other than six, allocation information can be generated with the use of virtual channel units by equally dividing the number of communication channels and defining virtual channel units as combinations of the equally divided communication channels.

Figure 4:
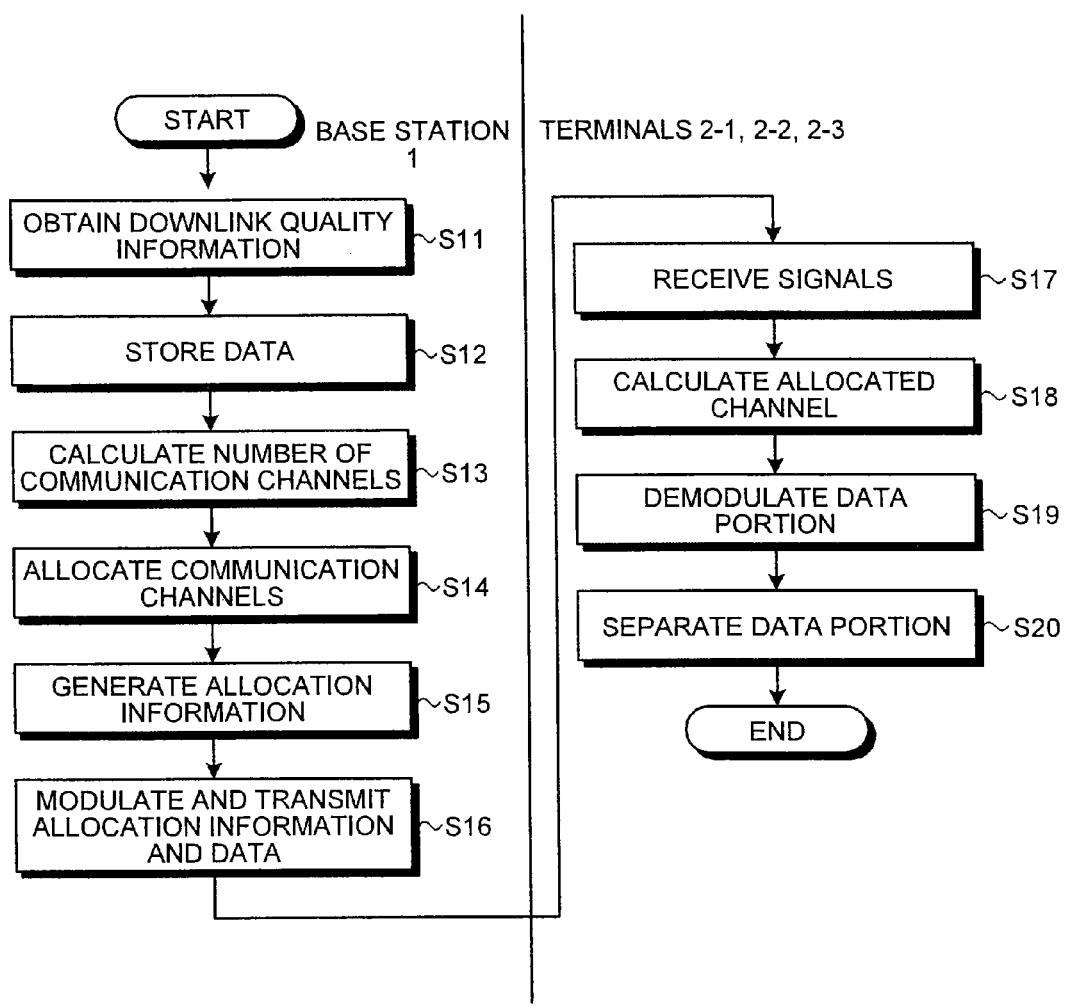
FIG. 4 is a flowchart for explaining a downlink channel allocation operation according to the first embodiment.
Figure 5:
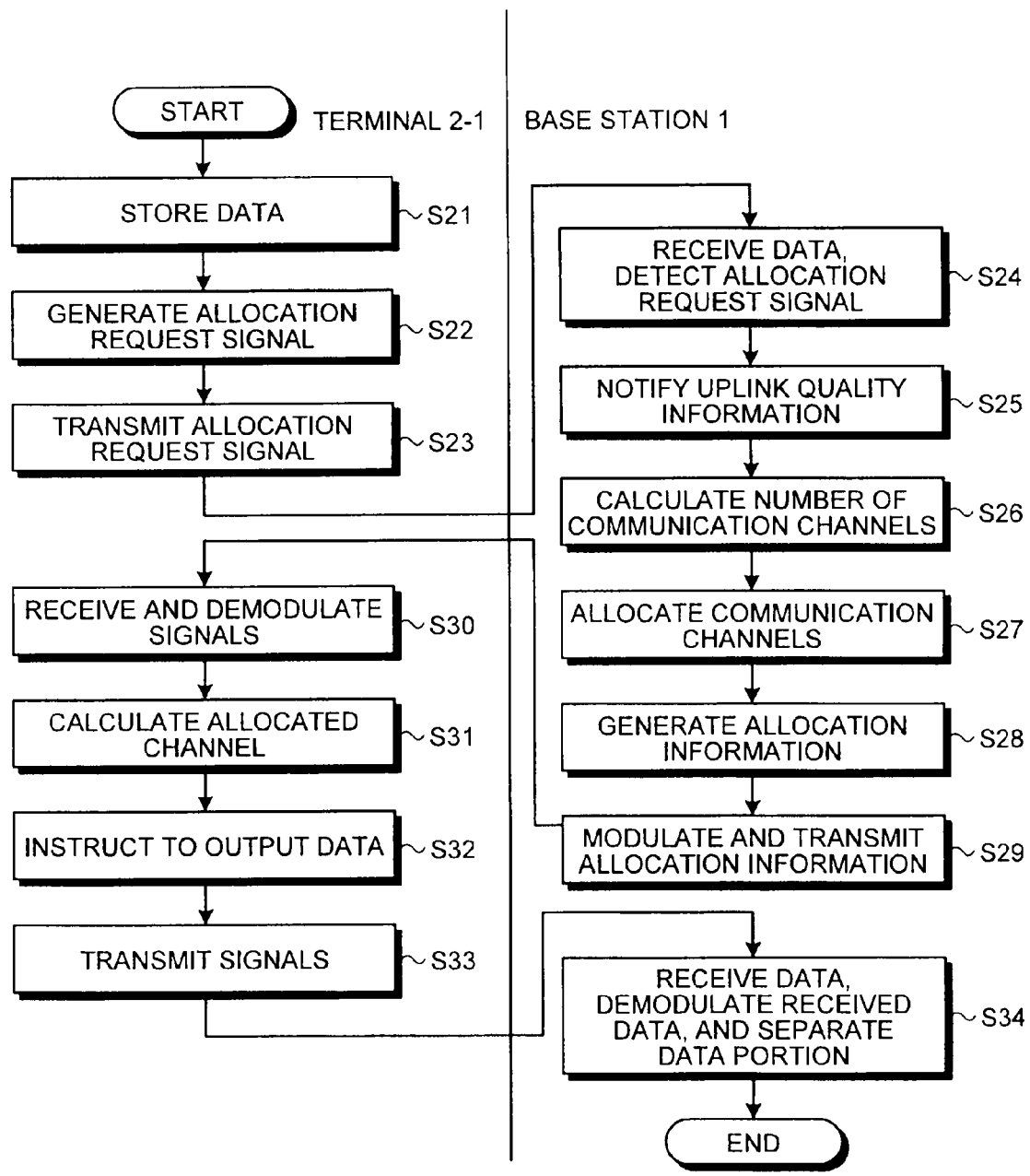
FIG. 5 is a flowchart for explaining an uplink channel allocation operation according to the first embodiment.

Given below is the description of channel allocation operations according to the first embodiment. FIGS. 4 and 5 are flowcharts for explaining a downlink channel allocation operation and an uplink channel allocation operation, respectively. The following description is given with reference to FIGS. 2, 3, 4, and 5.

In the downlink channel allocation operation, first, the receiving/demodulating unit 15 of the base station 1 receives signals transmitted by the terminals 2-1, 2-2, and 2-3, and demodulates the signals. The received-signal analyzing/separating unit 17 then retrieves downlink quality information from the demodulated data and sends the quality information to the channel allocating unit 11 (Step S11). The downlink quality information is the result of quality measurement when the receiving/demodulating unit 21 of each of the terminals 2-1, 2-2, and 2-3 receives a downlink signal and the quality measuring unit 23 measures the quality of the downlink signal. The modulating/transmitting unit 26 modulates the result of quality measurement performed by the quality measuring unit 23 and transmits the modulated information as the downlink quality information. Meanwhile, Step S11 can be performed until Step S13 is completed. That is, it is not necessary to perform Step S11 at the start of the channel allocation operation.

Subsequently, the base station 1 receives data intended for the terminals 2-1, 2-2, and 2-3 from the network 4 and stores the data in the data buffer unit 12 (Step S12). The channel allocating unit 11 of the base station 1 reads the stored data and calculates the required number of communication channels based on the data volume, the data type, and the destination terminal (Step S13). More particularly, the channel allocating unit 11 periodically refers to the data buffer unit 12 for stored data and performs Step S13 if data is stored in the data buffer unit 12.

Then, the channel allocating unit 11 allocates communication channels to each terminal based on the calculated number of communication channels and the downlink quality information notified by the received-signal analyzing/separating unit 17 (Step S14). At that time, if it is necessary to allocate a plurality of communication channels to a single terminal, then consecutive communication channels are given priority in allocation.

Subsequently, the control information generating unit 13 uses the result of channel allocation performed by the channel allocating unit 11 and, based on the abovementioned method of generating the allocation information 5-1, 5-2, and 5-3, generates the allocation information 5-1, 5-2, and 5-3 as well as information other than the channel allocation information specified in the communication system (Step S15: control information generation). Then, the modulating/transmitting unit 14 retrieves the result of channel allocation from the control information generating unit 13 and, based on the result of channel allocation, modulates the control information generated at Step S15 and the data stored in the data buffer unit 12, and sends modulated signals to the terminals 2-1, 2-2, and 2-3 (Step S16).

Subsequently, the receiving/demodulating unit 21 of each of the terminals 2-1, 2-2, and 2-3 receives the signals transmitted at Step S16 and demodulates the signals (Step S17). The received-signal analyzing/separating unit 22 of each of the terminals 2-1, 2-2, and 2-3 then retrieves the allocation information 5-1, 5-2, and 5-3, respectively, from the data demodulated at Step S17 and, by using the allocation information 5-1, 5-2, and 5-3, respectively, retrieves information about the communication channels allocated to the corresponding terminal (Step S18). The information about the communication channels can be retrieved from the allocation information 5-1, 5-2, and 5-3, by performing a reverse method of the method of generating the allocation information 5-1, 5-2, and 5-3. For example, following method can be performed. First, a table of virtual channel units (number of combined communication channels) and bit count of channel bits is maintained corresponding to values of the channel unit notifying bit. Then, the channel unit notifying bit and the channel bits corresponding to the bit count in each of the allocation information 5-1, 5-2, and 5-3 are read by referring to the table. Finally, the information about the allocated communication channels is retrieved by using the values of channel bits and the order of virtual channel units.

Subsequently, the received-signal analyzing/separating unit 22 of each of the terminals 2-1, 2-2, and 2-3 sends channel information about the allocated communication channels to the receiving/demodulating unit 21. The receiving/demodulating unit 21 then retrieves data portion from the channel information and demodulates the data portion (Step S19). Moreover, the received-signal analyzing/separating unit 22 separates the demodulated data portion and sends the separated data portion to the user interface devices 3-1, 3-2, and 3-3, respectively (Step S20).

At Step S20, a single downlink channel allocation operation is completed. However, in preparation for the subsequent downlink channel allocation operation, the quality measuring unit 23 of each of the terminals 2-1, 2-2, and 2-3 measures quality of subsequently received data and the modulating/transmitting unit 26 modulates the result of quality measurement and transmits the modulated information as the downlink quality information to the base station 1.

Given below is the uplink channel allocation operation. In the following description, the uplink channel allocation operation is performed with respect to a channel allocation request issued by the terminal 2-1. Meanwhile, the channel allocation operation is performed in an identical manner with respect to a channel allocation request issued by the terminal 2-2 or the terminal 2-3. First, upon receiving user operations, the user interface device 3-1 generates data intended for a destination and transmits the data to the terminal 2-1. The terminal 2-1 receives the data and stores it in the data buffer unit 24 (Step S21). The allocation request generating unit 25 periodically refers to the data buffer unit 24 and, if data is stored in the data buffer unit 24, generates an allocation request signal and sends it to the modulating/transmitting unit 26 (Step S22). The allocation request signal includes allocation request information (information necessary for channel allocation such as identification information for terminal, identification information for type of data to be transmitted, and data volume). The modulating/transmitting unit 26 modulates the allocation request signal and sends it to the base station 1 (Step S23).

Subsequently, the receiving/demodulating unit 15 of the base station 1 receives and demodulates the allocation request signal. The received-signal analyzing/separating unit 17 detects the allocation request signal from the demodulated data, retrieves the allocation request information from the allocation request signal, and sends the allocation request information to the channel allocating unit 11 (Step S24).

The quality measuring unit 16 measures the quality of an uplink signal received by the receiving/demodulating unit 15 and notifies the quality to the channel allocating unit 11 (Step S25). Subsequently, the channel allocating unit 11 uses the allocation request information received at Step S24 and calculates the number of required communication channels (Step S26). Then, based on the calculated number of communication channels and the uplink quality information received at Step S25, the channel allocating unit 11 allocates communication channels to the terminal 2-1, which is the issuer of the channel allocation request (Step S27).

Subsequently, the control information generating unit 13 uses the result of channel allocation performed by the channel allocating unit 11 and generates the allocation information 5-1 as well as information other than the channel allocation information specified in the communication system (Step S28). The method of generating the allocation information 5-1 by using the result of channel allocation performed by the channel allocating unit 11 is identical to the method regarding the downlink performed at Step S15. The modulating/transmitting unit 14 then modulates the control information generated at Step S28 and transmits a modulated signal to the terminal 2-1 (Step S29).

Subsequently, the receiving/demodulating unit 21 receives and demodulates the signal transmitted at Step S29 (Step S30). The received-signal analyzing/separating unit 22 of the terminal 2-1 then retrieves the allocation information 5-1 from the signal demodulated at Step S30 and uses the allocation information 5-1 to retrieve information about the communication channels allocated thereto (Step S31). The method of retrieving information about allocated communication channels is identical to the method regarding the downlink performed at Step S18.

Subsequently, the received-signal analyzing/separating unit 22 informs the modulating/transmitting unit 26 about the allocated communication channels and instructs the data buffer unit 24 to output data to the modulating/transmitting unit 26 (Step S32). The modulating/transmitting unit 26 of the terminal 2-1 then modulates the data output by the data buffer unit 24 based on the allocation information 5-1 and transmits a modulated signal (Step S33).

The receiving/demodulating unit 15 of the base station 1 receives and demodulates the signal transmitted at Step S33. The received-signal analyzing/separating unit 17 then separates data portion from the demodulated data and delivers the data portion to the network (Step S34).

In this way, according to the first embodiment, virtual channel units are defined by combining a plurality of communication channels. The allocation information is generated as virtual channel units with the use of channel unit notifying bits and channel bits. Thus, during notifying of channel allocation information, it becomes possible to reduce the bit count for the allocation information 5-1, 5-2, and 5-3 as compared to the conventional bit map method.

Second Embodiment

Figure 6:
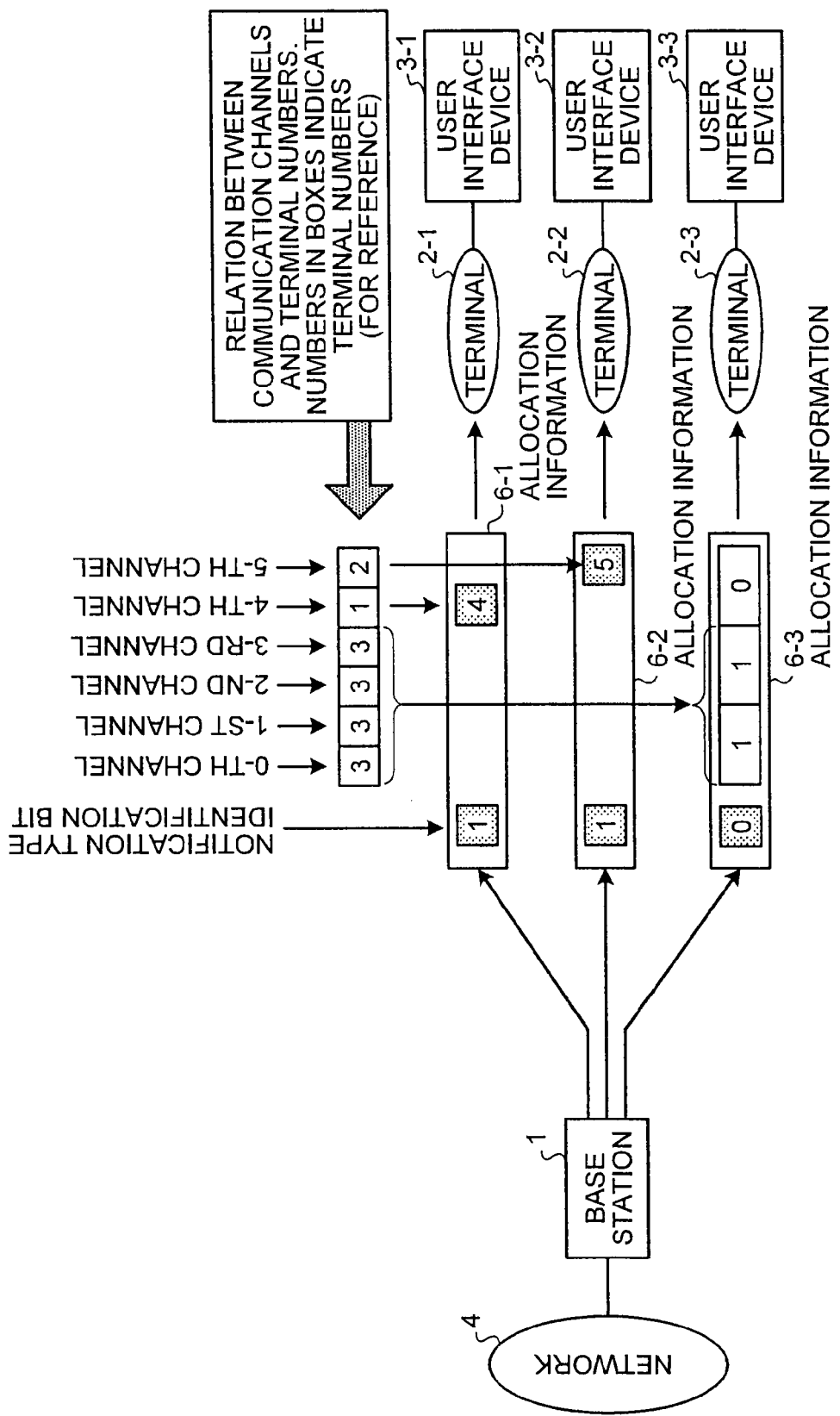
FIG. 6 is a diagram of an exemplary configuration of a communication system according to a second embodiment.

FIG. 6 is a diagram of an exemplary configuration of a communication system according to a second embodiment of the present invention. In the second embodiment, allocation information 6-1, 6-2, and 6-3 is generated instead of the allocation information 5-1, 5-2, and 5-3. Apart from that, the configuration of the communication system is identical to that according to the first embodiment. The allocation information 6-1, 6-2, and 6-3 is channel allocation information intended for the terminals 2-1, 2-2, and 2-3, respectively. The constituent elements in the second embodiment that have identical functionality to the constituent elements in the first embodiment are referred to by the same reference numerals and their description is not repeated. Thus, the functional configuration of the base station 1 and the terminals 2-1, 2-2, and 2-3 according to the second embodiment is identical to that according to the first embodiment. According to the second embodiment, when only a single communication channel is allocated to a terminal, channel number of that communication channel is directly notified as the allocation information to that terminal.

Given below is the description of a method of generating the allocation information 6-1, 6-2, and 6-3 according to the second embodiment. In the example shown in FIG. 6, only the 4-th communication channel is allocated to the terminal 2-1, only the 5-th communication channel is allocated to the terminal 2-2, and four channels from the 0-th communication channel to the 3-rd communication channel are allocated to the terminal 2-3.

As shown in FIG. 6, each of the allocation information 6-1, 6-2, and 6-3 includes a notification type identification bit and channel bits. The notification type identification bit is a single bit to which "1" is assigned when the allocation information is notified with a channel of first order (i.e., a single communication channel) and "0" is assigned when the allocation information is notified with virtual channels of second order. In the case of notifying with a channel of first order, the bit count of channel bits is the number of bits required to directly notify the channel number (in this case, because the number of channels is six, the bit count is three bits). In the case of notifying with virtual channels of second order, the bit count is the number of virtual channels of second order (in this case, the bit count is three).

Because a single communication channel is allocated to each of the terminals 2-1 and 2-2, the notification type identification bit of each of the allocation information 6-1 and 6-2 is set to "1". Because each channel bit represents the channel number of the corresponding allocated communication channel, the channel bit in the allocation information 6-1 is set to "4" and the channel bit in the allocation information 6-1 is set to "5". Herein, the channel bits are shown as decimal numbers such that the correspondence between a channel number and a channel bit is not ambiguous. However, in practice, the channel bit is represented as a three-bit binary number.

On the other hand, because four ambiguous channels are allocated to the terminal 2-3, the allocation information is notified with virtual channels of second order. Thus, the notification type identification bit is set to "0", while the channel bit corresponding to the virtual channel unit of the 0-th bit and the 1-st bit and the channel bit corresponding to the virtual channel unit of the 2-nd bit and the 3-rd bit is set to "1". The remaining channel bit is set to "0". Meanwhile, the method of generating the channel bits corresponding to virtual channels of second order is identical to that described in the first embodiment.

In a channel allocation operation according to the second embodiment, Steps S15 and S28 described in the first embodiment and shown in FIGS. 4 and 5 are used to generate the allocation information 6-1, 6-2, and 6-3 according to the second embodiment shown in FIG. 6. Moreover, Steps S18 and S31 are used to retrieve information about allocated communication channels from the allocation information 6-1, 6-2, and 6-3. Apart from that, the channel allocation operation according to the second embodiment is identical to that described in the first embodiment.

In the second embodiment, description is given about channel allocation of a single communication channel and channel allocation of virtual channels of second order. However, channel allocation in other cases than the abovementioned cases can be performed by using the notification type identification bit and the channel unit notifying bit in combination. For example, if the notification type identification bit is set to "0", channel allocation can be performed by referring to the channel unit notifying bit. In that case also, the method of generating the channel unit notifying bit and the channel bits is identical to that described in the first embodiment.

In this way, according to the second embodiment, when only a single communication channel is allocated to a terminal, channel number of that communication channel is notified to that terminal as the allocation information. Consequently, when the available number of as the allocation information channels is three or more, it becomes possible to reduce the volume of the allocation information as compared to the case when the conventional bit map method is used for notifying. Particularly, when the number of channels is large, it is possible to reduce substantial data volume.

Third Embodiment

Figure 7:
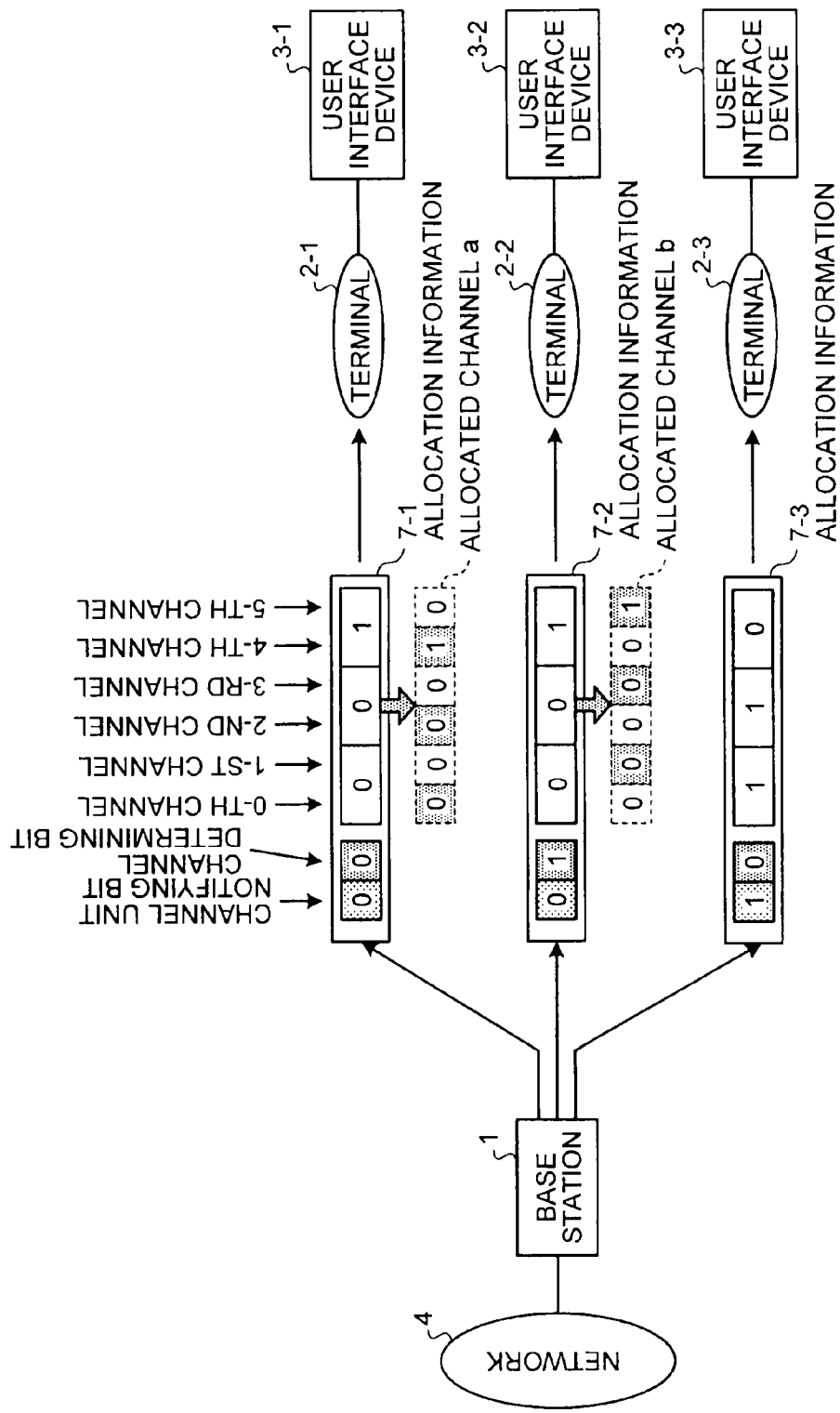
FIG. 7 is a diagram of an exemplary configuration of a communication system according to a third embodiment.

FIG. 7 is a diagram of an exemplary configuration of a communication system according to a third embodiment of the present invention. In the third embodiment, allocation information 7-1, 7-2, and 7-3 is generated instead of the allocation information 5-1, 5-2, and 5-3. Apart from that, the configuration of the communication system is identical to that according to the first embodiment. The allocation information 7-1, 7-2, and 7-3 is channel allocation information intended for the terminals 2-1, 2-2, and 2-3, respectively. The constituent elements in the third embodiment that have identical functionality to the constituent elements in the first embodiment are referred to by the same reference numerals and their description is not repeated. Thus, the functional configuration of the base station 1 and the terminals 2-1, 2-2, and 2-3 according to the third embodiment is identical to that according to the first embodiment. According to the third embodiment, each of the allocation information 7-1, 7-2, and 7-3 is notified with virtual channels of second order. In the case of notifying a single communication channel from a virtual channel of second order, a channel determining bit is appended to enable identification of an allocated communication channel from among the two communication channels in the virtual channel of second order.

Given below is the description of a method of generating the allocation information 7-1, 7-2, and 7-3 according to the third embodiment. In the example shown in FIG. 7, only the 4-th communication channel is allocated to the terminal 2-1, only the 5-th communication channel is allocated to the terminal 2-2, and four channels from the 0-th communication channel to the 3-rd communication channel are allocated to the terminal 2-3.

As shown in FIG. 7, each of the allocation information 7-1, 7-2, and 7-3 includes a channel unit notifying bit, a channel determining bit, and channel bits. The channel unit notifying bit is a single bit that, in the case of allocating a single communication channel, is set to "1" indicating that it is necessary to refer to the channel determining bit and, in the case of allocating virtual channels of second order, is set to "0" indicating that it is not necessary to refer to the channel determining bit because both channels in a virtual channel of second order are allocated. The channel determining bit is a single bit that is set to "0" when the communication channel having the smaller channel number (communication channel on the left side) is allocated and is set to "1" when the communication channel having the larger channel number (communication channel on the right side) is allocated. The channel determining bit is not used when the channel unit notifying bit is set to "1". In that case, at the time of data generation, it is determined in advance whether to set "0" or "1" to the channel determining bit and it is not referred at the time of reception. Alternatively, when the channel unit notifying bit is set to "1", it is also possible to delete the channel determining bit while notifying the allocation information. The bit count of channel bits is maintained equal to the number of virtual channels of second order (in this case, the bit count is three) for all cases including the case of allocating a single communication channel.

As shown in FIG. 7, because a single communication channel is allocated to each of the terminals 2-1 and 2-2, the channel unit notifying bit in each of the allocation information 7-1 and 7-2 is set to "0". Moreover, because the 4-th communication channel is allocated to the terminal 2-1, the channel bit of the virtual channel of second order formed by combining the 4-th communication channel and the 5-th communication channel (in this case, the leftmost bit) in the allocation information 7-1 is set to "1" and the other channel bits are set to "0". Furthermore, because the 4-th communication channel having the smaller channel number in the combination of the 4-th communication channel and the 5-th communication channel is allocated, the channel determining bit is set to "0".

Regarding the allocation information 7-2 in which the 5-th communication channel is allocated to the terminal 2-2, the channel bits are assigned with identical values to the allocation information 7-1. However, because the 5-th communication channel having the larger channel number in the combination of the 4-th communication channel and the 5-th communication channel is allocated, the channel determining bit is set to "1".

Regarding the allocation information 7-3, because the first four channels are allocated to the terminal 2-3, the channel unit notifying bit is set to "1". In that case, "1" is assigned to the channel bit corresponding to the combination of the 0-th communication channel and the 1-st communication channel as well as to the channel bit corresponding to the combination of the 2-nd communication channel and the 3-rd communication channel, while "0" is assigned to the remaining channel bit. Meanwhile, the method of generating the channel bits of virtual channels of second order is identical to that described in the first embodiment.

In a channel allocation operation according to the third embodiment, Steps S15 and S28 described in the first embodiment and shown in FIGS. 4 and 5 are used to generate the allocation information 7-1, 7-2, and 7-3 according to the third embodiment shown in FIG. 7. Moreover, Steps S18 and S31 are used to retrieve information about allocated communication channels from the allocation information 7-1, 7-2, and 7-3. Apart from that, the channel allocation operation according to the third embodiment is identical to that described in the first embodiment.

In the third embodiment, description is given about channel allocation of a single communication channel and channel allocation of virtual channels of second order. However, channel allocation in other cases than the abovementioned cases can be performed by appending an additional bit that indicates whether the bit map method is used for notifying. In the case of notifying by the bit map method, the channel unit notifying bit and the method of generating the channel bits for allocation information are identical to that described in the first embodiment.

In this way, according to the third embodiment, a channel determining bit is appended that indicates which one of the two consecutive communication channels in a virtual channel of second order is allocated. Moreover, even if a single communication channel is allocated, allocation information is notified with virtual channels of second order. Thus, it becomes possible to reduce the volume of the allocation information as compared to the case when the conventional bit map method is used for notifying.

Fourth Embodiment

Figure 8:
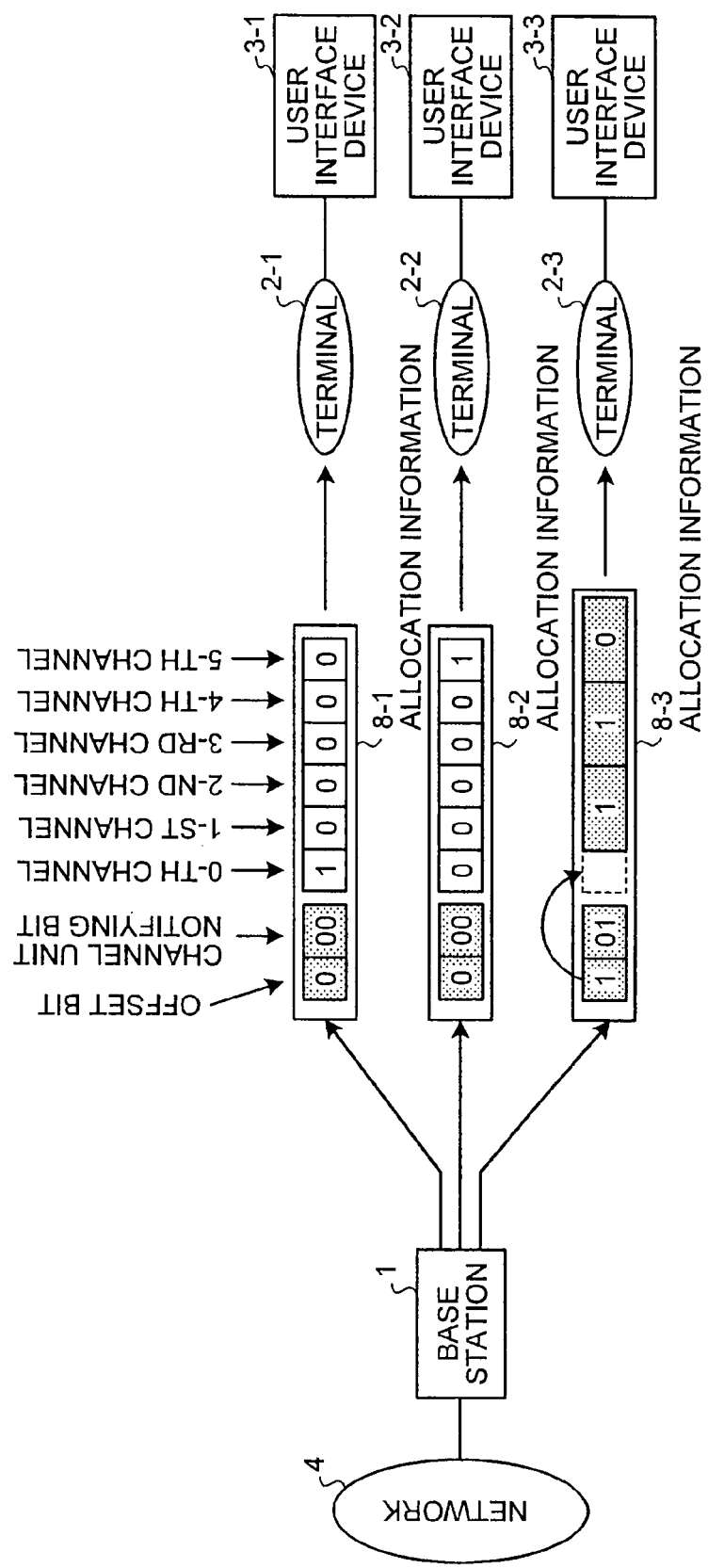
FIG. 8 is a diagram of an exemplary configuration of a communication system according to a fourth embodiment.

FIG. 8 is a diagram of an exemplary configuration of a communication system according to a fourth embodiment of the present invention. In the fourth embodiment, allocation information 8-1, 8-2, and 8-3 is generated instead of the allocation information 5-1, 5-2, and 5-3. Apart from that, the configuration of the communication system is identical to that according to the first embodiment. The allocation information 8-1, 8-2, and 8-3 is channel allocation information intended for the terminals 2-1, 2-2, and 2-3, respectively. The constituent elements in the fourth embodiment that have identical functionality to the constituent elements in the first embodiment are referred to by the same reference numerals and their description is not repeated. Thus, the functional configuration of the base station 1 and the terminals 2-1, 2-2, and 2-3 according to the fourth embodiment is identical to that according to the first embodiment. According to the fourth embodiment, an offset bit is appended to enable processing of combinations of communication channels in virtual channels of second order that are different than the combinations of communication channels in the virtual channels of second order defined in the first embodiment.

Given below is the description regarding the allocation information 8-1, 8-2, and 8-3 according to the fourth embodiment. In the example shown in FIG. 8, only the 0-th communication channel is allocated to the terminal 2-1, only the 5-th communication channel is allocated to the terminal 2-2, and four channels from the 1-st communication channel to the 4-th communication channel are allocated to the terminal 2-3.

Thus, although four consecutive communication channels are allocated to the terminal 2-3 as the allocation information, it is not possible to notify the allocation information with the virtual channels of second order defined in the first embodiment. That is because, the virtual channels of second order fixed according to the first embodiment are formed by the combination of the 0-th communication channel and the 1-st communication channel, the combination of the 2-nd communication channel and the 3-rd communication channel, and the combination of the 4-th communication channel and the 5-th communication channel. However, according to the third embodiment, an offset bit is appended as shown in FIG. 8 such that virtual channel units can be defined with different combinations of communication channels than the combinations of communication channels described in the first embodiment.

As shown in FIG. 8, each of the allocation information 8-1, 8-2, and 8-3 includes a single-bit offset bit, a two-bit channel unit notifying bit, and channel bits equal to the bit count of the number of communication channels. The offset bit is set to "0" when no offsetting is performed. In that case, the channel unit notifying bit and the channel bits have identical meaning as described in the first embodiment. The offset bit is set to "1" when the channel bits are notified with one channel offset. By performing one channel offset for notifying, information (allocation or non-allocation) of the 1-st communication channel is shown at the position of the pre-offset 0-th communication channel, information of the 2-nd communication channel is shown at the position of the pre-offset 1-st communication channel, and so on. That is, information of an n+1-th channel is shown at the position of a pre-offset n-th channel. Moreover, information of a channel having the smallest channel number (i.e., the 0-th communication channel in FIG. 8) is shown at the position of the pre-offset channel having the largest channel number (i.e., the 5-th communication channel in FIG. 8).

Thus, when the offset bit is set to "0", the channel bit having the smallest channel number (i.e., the leftmost bit in the example shown in FIG. 8) indicates allocation or non-allocation of the 0-th communication channel. When the offset bit is set to "1", the channel bit having the smallest channel number indicates allocation or non-allocation of the 1-st communication channel. In the example shown in FIG. 8, the offset bit in the allocation information 8-3 is set to "1" and the channel unit notifying bit is set to "01". Thus, the allocation information 8-3 is notified by virtual channels of second order with one channel offset. In that case, the leftmost channel bit represents a virtual channel of second order formed by combining the 1-st communication channel and the 2-nd communication channel, the central channel bit represents a virtual channel of second order formed by combining the 3-rd communication channel and the 4-th communication channel, and the rightmost channel bit represents a virtual channel of second order formed by combining the 5-th communication channel and the 0-th communication channel.

Because four channels from the 1-st communication channel to the 4-th communication channel are allocated to the terminal 2-3, the leftmost channel bit and the central channel bit are set to "1", the rightmost channel bit is set to "0".

In a channel allocation operation according to the fourth embodiment, Steps S15 and S28 described in the first embodiment and shown in FIGS. 4 and 5 are used to generate the allocation information 8-1, 8-2, and 8-3 according to the fourth embodiment shown in FIG. 8. Moreover, Steps S18 and S31 are used to retrieve information about allocated communication channels from the allocation information 8-1, 8-2, and 8-3. Apart from that, the channel allocation operation according to the third embodiment is identical to that described in the first embodiment.

Although, in the fourth embodiment, information of the n+1-th channel is shown at the position of a pre-offset n-th channel, it is also possible to show information of an n-th channel at the position of a pre-offset n+1-th channel. Moreover, although the offset bit is appended as a single bit to indicate whether one channel offset is performed, it is also possible to set an offset bit of two bits or more to enable processing of the combinations of communication channels in virtual channels of third order or more.

Furthermore, in the third embodiment, although an offset bit is appended to the configuration according to the first embodiment, it is also possible to append an offset bit to the configuration according to the second and third embodiments in an identical manner. In the case of the second embodiment, by appending and using an offset bit to notify allocation information with virtual channels of second order (i.e., when the notification type identification bit is set to "0"), it is possible to define different combinations of communication channels as the virtual channels of second order in an identical manner to the fourth embodiment. In the case of the third embodiment, it is possible to make use of the channel determining bit, which remains idle when allocation information is notified with virtual channels of second order (i.e., when the notification type identification bit is set to "1"). That is, when the notification type identification bit indicates that allocation information is notified with virtual channels of second order, the channel determining bit can be used as the offset bit. Thus, without appending an extra bit, it becomes possible to define different combinations of communication channels as the virtual channels of second order.

In this way, according to the fourth embodiment, it is possible to define different combinations of communication channels as virtual channels of second order. As a result, even when the virtual channels of second order according to the first embodiment cannot be used to notify allocation information, the allocation information can be notified with the virtual channels of second order according to the fourth embodiment. That facilitates in reducing larger volume of allocation information as compared to the first embodiment.

Fifth Embodiment

Figure 9:
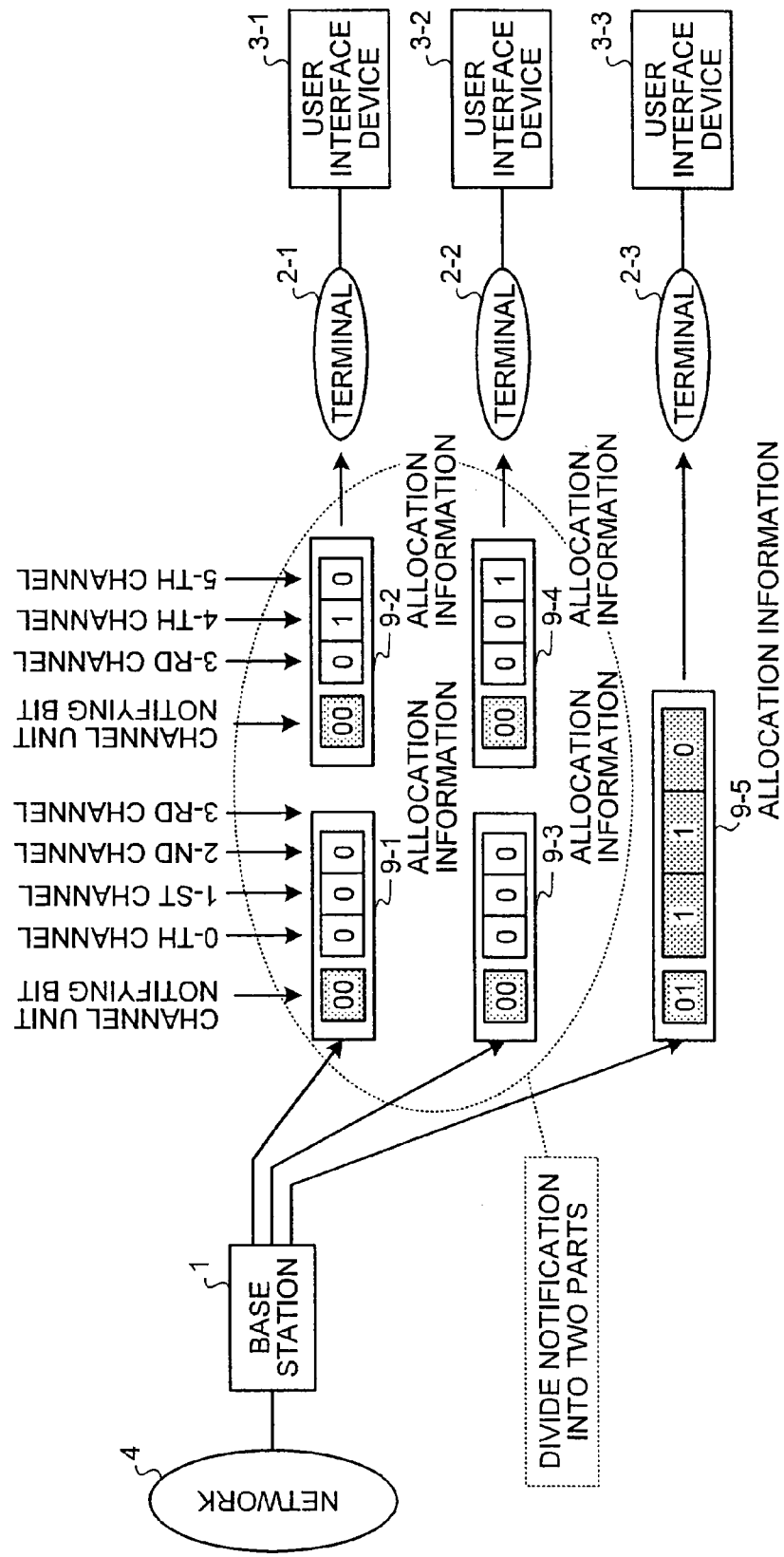
FIG. 9 is a diagram of an exemplary configuration of a communication system according to a fifth embodiment.

FIG. 9 is a diagram of an exemplary configuration of a communication system according to a fifth embodiment of the present invention. In the fifth embodiment, allocation information 9-1, 9-2, 9-3, 9-4, and 9-5 is generated instead of the allocation information 5-1, 5-2, and 5-3. Apart from that, the configuration of the communication system is identical to that according to the first embodiment. The allocation information 9-1 and 9-2 is channel allocation information intended for the terminal 2-1, the allocation information 9-3 and 9-4 is channel allocation information intended for the terminal 2-2, and the allocation information 9-5 is channel allocation information intended for the terminal 2-3. The constituent elements in the fifth embodiment that have identical functionality to the constituent elements in the first embodiment are referred to by the same reference numerals and their description is not repeated. Thus, the functional configuration of the base station 1 and the terminals 2-1, 2-2, and 2-3 according to the fifth embodiment is identical to that according to the first embodiment.

According to the first embodiment, the available bit count of channel bits depends on the order of the virtual channel units. Thus, it is not possible to determine the bit count in advance thereby making the process of receiving allocation information complicated. To solve such a problem, according to the fifth embodiment, the bit count of channel bits for allocation information is maintained constant. For that, transmittable bit count of channel bits is determined in advance and, when the actual bit count of channel bits exceeds the transmittable bit count, the allocation information is segmented before transmission.

Given below is the description of a method of generating the allocation information 9-1, 9-2, 9-3, 9-4, and 9-5 according to the fifth embodiment. In the example shown in FIG. 9, only the 4-th communication channel is allocated to the terminal 2-1, only the 5-th communication channel is allocated to the terminal 2-2, and four channels from the 0-th communication channel to the 3-rd communication channel are allocated to the terminal 2-3.

According to the fifth embodiment, first, a channel unit notifying bit and channel bits are generated as part of allocation information. As in the case of the first embodiment, the channel unit notifying bit indicates the order used for notifying the channel allocation information, while the channel bits indicate allocation of each channel by the bit map method. When the actual channel bits exceed a transmittable bit count (which is three according to the fifth embodiment) determined in advance, the channel bits are divided at the transmittable bit count and a channel unit notifying bit is appended to each set of divided channel bits. According to the fifth embodiment, the transmittable bit count of channel bits is assumed to be three.

In FIG. 9, if allocation information intended for the terminal 2-1 is generated in an identical manner to that described in the first embodiment, then six channel bits are generated thereby exceeding the transmittable bit count of channel bits, which is three. In that case, the allocation information intended for the terminal 2-1 is segmented into sets of three channel bits and a channel unit notifying bit is appended to each set of divided channel bits. As a result, two segmented sets of allocation information (i.e., the allocation information 9-1 and 9-2) are formed. The channel unit notifying bit of each of the allocation information 9-1 and 9-2 is maintained identical to the channel unit notifying bit prior to the segmentation of allocation information. In the same way, allocation information intended for the terminal 2-2 is segmented into the allocation information 9-3 and 9-4.

On the other hand, if allocation information intended for the terminal 2-3 is generated in an identical manner to that described in the first embodiment, the number of generated channel bits is three, which is equal to the transmittable bit count of channel bits. Thus, the allocation information 9-5 is generated without segmentation.

Each of the terminals 2-1 and 2-2 receives two segmented sets of allocation information. In that case, it is necessary to distinguish the segmented set of allocation information corresponding to the communication channels from the 0-th communication channel to the 2-nd communication channel and the segmented set of allocation information corresponding to the communication channels from the 3-rd communication channel to the 5-th communication channel. For that, any one of segmentation methods such as varying the transmission timing (temporal segmentation), varying the transmission frequency (frequency segmentation), or varying the transmission direction (special segmentation) can be implemented to distinguish the segmented allocation information. For example, during frequency segmentation, the information corresponding to the communication channels from the 0-th communication channel to the 2-nd communication channel (i.e., the allocation information 9-1 and 9-3) is transmitted at a different frequency than the information corresponding to the communication channels from the 3-rd communication channel to the 5-th communication channel (i.e., the allocation information 9-2 and 9-4).

Moreover, by setting a transmission condition different in terms of time, frequency, or space to the segmented allocation information corresponding to each set of divided channel bits, there is no need to transmit all segmented sets of allocation information. That is, it is sufficient to transmit only that segmented set of allocation information which includes the communication channel allocated to the corresponding terminal (e.g., in the case of the terminal 2-1, only the allocation information 9-2 is transmitted). For example, consider a case when allocation information corresponding to the communication channels from the 0-th communication channel to the 2-nd communication channel is transmitted at a frequency F1 and allocation information corresponding to the channels from the 3-rd communication channel to the 5-th communication channel is transmitted at a frequency F2. In that case, regarding the terminal 2-1 in FIG. 9, it is sufficient to transmit only the allocation information 9-2 at the frequency F2. Because the terminal 2-1 receives the allocation information 9-2 at the frequency F2, it can be determined that the allocation information 9-2 corresponds to the communication channels from the 3-rd communication channel to the 5-th communication channel. Moreover, from the fact that only the central channel bit in the allocation information 9-2 is set to "1", it can be determined that only the 4-th communication channel is allocated to the terminal 2-1. Meanwhile, if the terminal 2-1 does not receive allocation information at the frequency F1 within a predetermined elapsed time since receiving the allocation information 9-2 at the frequency F2, then it can be determined that no communication channel from among the 0-th communication channel to the 2-nd communication channel is allocated to the terminal 2-1.

In a channel allocation operation according to the fifth embodiment, Steps S15 and S28 described in the first embodiment and shown in FIGS. 4 and 5 are used to generate the allocation information 9-1, 9-2, 9-3, 9-4, and 9-5 according to the fifth embodiment shown in FIG. 9. Moreover, Steps S18 and S31 are used to retrieve information about allocated communication channels from the allocation information 9-1, 9-2, 9-3, 9-4, and 9-5. Apart from that, the channel allocation operation according to the fifth embodiment is identical to that described in the first embodiment.

Although, according to the fifth embodiment, the transmittable bit count of channel bits is three, it is possible to appropriately determine the transmittable bit count of channel bits by taking into consideration conditions such as the number of available communication channels in a communication system or the highest order of virtual channel units. Meanwhile, if the number of available communication channels is not an integral multiple of the transmittable bit count of channel bits, there is a possibility that the number of communication channels corresponding to a segmented set of allocation information is less than the transmittable bit count. In such a case, dummy data is appended such that the total bit count of the dummy data and the communication channels used for notifying is equal to the transmittable bit count of channel bits.

In this way, according to the fifth embodiment, the transmittable bit count of allocation information is fixed and, when the actual channel bits exceed the transmittable bit count, the allocation information is segmented at the transmittable bit count. As a result, the transmittable bit count is always maintained constant. That facilitates in reducing the amount of processing in the terminal that receives the allocation information as compared to the first embodiment.

Sixth Embodiment

Figure 10:
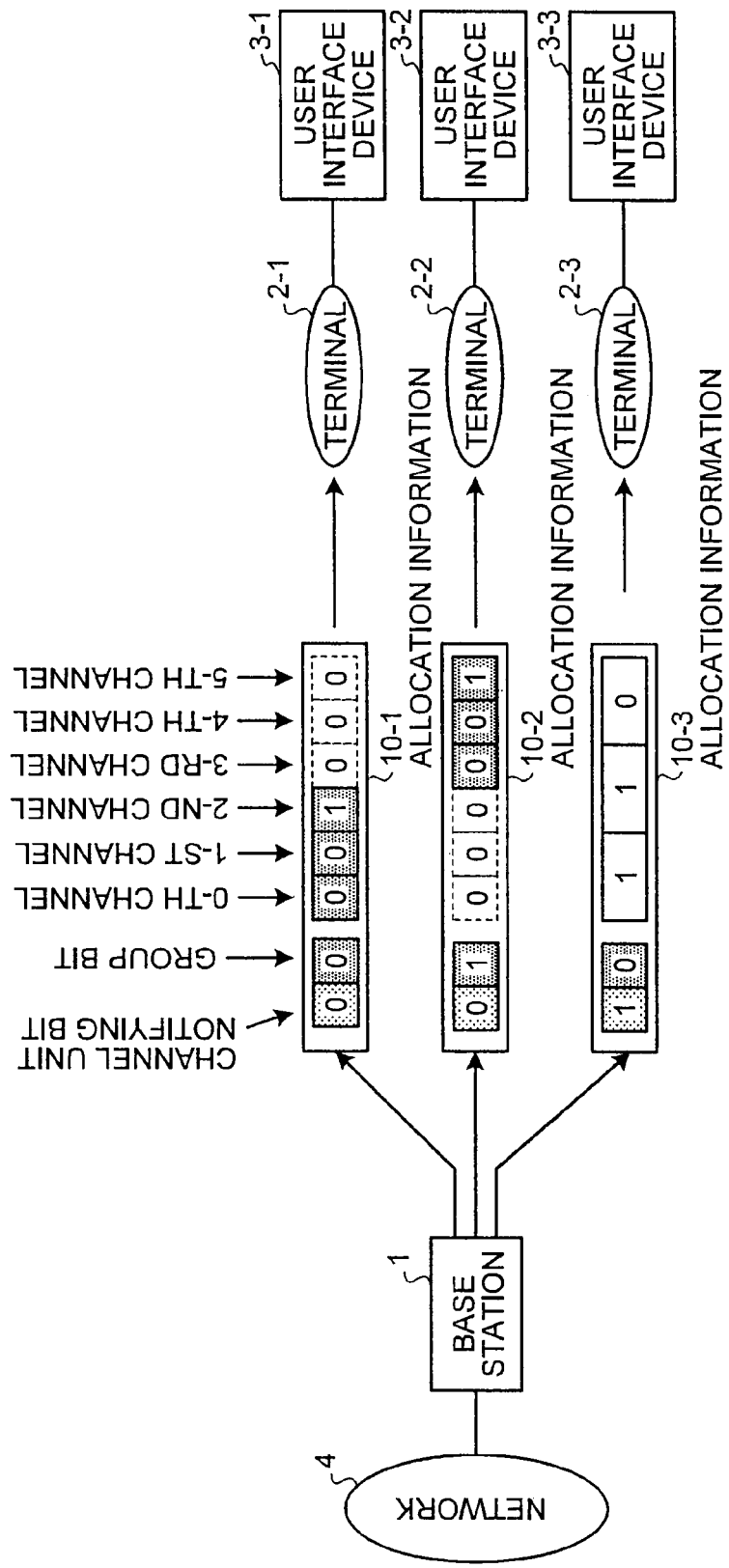
FIG. 10 is a diagram of an exemplary configuration of a communication system according to a sixth embodiment.
Figure 11:
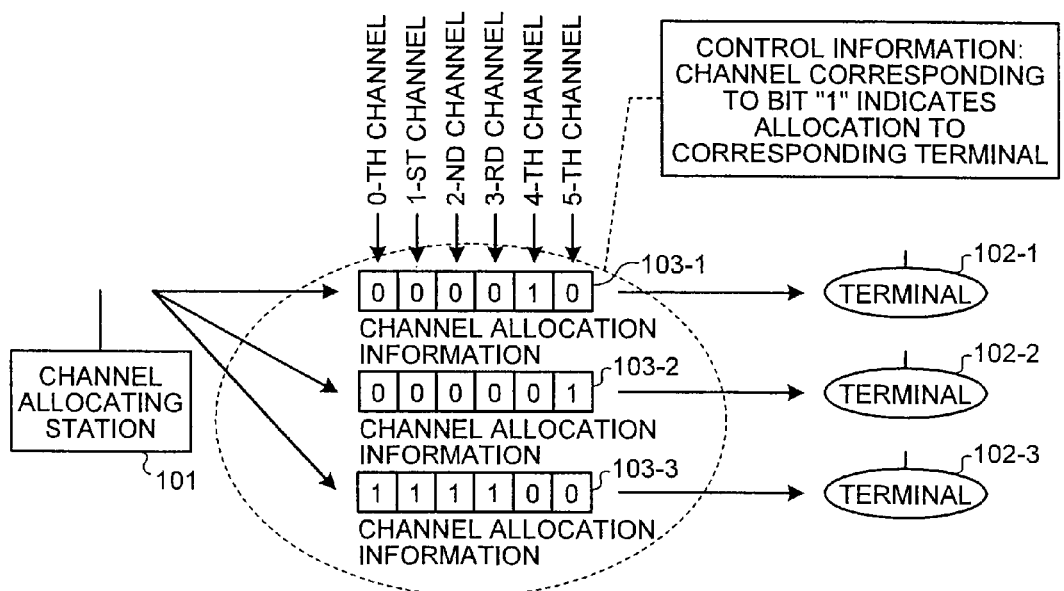
FIG. 11 is a diagram for explaining a conventional channel allocation method.

FIG. 10 is a diagram of an exemplary configuration of a communication system according to a sixth embodiment of the present invention. In the sixth embodiment, allocation information 10-1, 10-2, and 10-3 is generated instead of the allocation information 5-1, 5-2, and 5-3. Apart from that, the configuration of the communication system is identical to that according to the first embodiment. The allocation information 10-1, 10-2, and 10-3 is channel allocation information intended for the terminals 2-1, 2-2, and 2-3, respectively. The constituent elements in the sixth embodiment that have identical functionality to the constituent elements in the first embodiment are referred to by the same reference numerals and their description is not repeated. Thus, the functional configuration of the base station 1 and the terminals 2-1, 2-2, and 2-3 according to the sixth embodiment is identical to that according to the first embodiment.

According to the first embodiment, the available bit count of channel bits depends on the order of the virtual channel units. Thus, it is not possible to determine the bit count in advance thereby making the process of receiving allocation information complicated. To solve such a problem, according to the sixth embodiment, the bit count of channel bits for allocation information is maintained constant. For that, when allocation information is notified with a channel of first order, the communication channels are divided into two groups (hereinafter, "channel groups") and a group notification bit is appended to the allocation information by which it is possible to identify the channel group that includes the allocated communication channel. Subsequently, allocation information corresponding only to the channel group including the allocated communication channel is transmitted.

Given below is the description of a method of generating the allocation information 10-1, 10-2, and 10-3 according to the sixth embodiment. In the example shown in FIG. 10, only the 2-nd communication channel is allocated to the terminal 2-1, only the 5-th communication channel is allocated to the terminal 2-2, and two communication channels, namely, the 0-th communication channel and the 1-st communication channel are allocated to the terminal 2-3.

According to the sixth embodiment, first, a channel unit notifying bit and channel bits are generated as part of the allocation information. As in the case of the first embodiment, the channel unit notifying bit indicates the order used for notifying the channel allocation information, while the channel bits indicate allocation of each channel by the bit map method. However, according to the sixth embodiment, the channel unit notifying bit is assumed to be a single bit and the highest order for virtual channel units is assumed to be the second order. In the case of notifying with a channel of first order, the channel bits are divided into two channel groups, namely, a first channel group that includes the communication channels from the 0-th communication channel to the 2-nd communication channel and a second channel group that includes the communication channels from the 3-rd communication channel to the 5-th communication channel.

Because a single communication channel is allocated to each of the terminals 2-1 and 2-2, channel groups including the communication channels allocated to the terminals 2-1 and 2-2, respectively, are retrieved. If the allocated communication channel is present in the first channel group, the group bit is set to "0" and when the allocated communication channel is present in the second channel group, the group bit is set to "1". Then, only those channel bits are selected which correspond to the communication channels of the channel group that includes the allocated communication channel (i.e., in the example shown in FIG. 10, the channel bits of the communication channels from the 0-th communication channel to the 2-nd communication channel are selected for the terminal 2-1, while the channel bits of the communication channels from the 3-rd communication channel to the 5-th communication channel are selected for the terminal 2-2). Finally, the channel unit notifying bit, the group bit, and the selected channel bits are notified to the corresponding terminal as the allocation information.

On the other hand, in the case of the terminal 2-3, allocation information is generated in an identical manner to that described in the first embodiment and is notified with virtual channels of second order. Thus, it is possible to transmit the channel bits as they are without having to select particular channel groups. In that case, the terminal 2-3 treats the group bit as a dummy bit and does not use it for processing.

In a channel allocation operation according to the sixth embodiment, Steps S15 and S28 described in the first embodiment and shown in FIGS. 4 and 5 are used to generate the allocation information 10-1, 10-2, and 10-3 according to the sixth embodiment shown in FIG. 10. Moreover, Steps S18 and S31 are used to retrieve information about allocated communication channels from the allocation information 10-1, 10-2, and 10-3. Apart from that, the channel allocation operation according to the sixth embodiment is identical to that described in the first embodiment.

Although, according to the sixth embodiment, the channel unit notifying bit is a single bit and the highest order for virtual channel units is the second order, it is also possible to use the channel unit notifying bit of two bits or more and virtual channel units of third order or more. In the case of virtual channel units of third order or more, the bit count of the group bit also changes in accordance with the number of channel groups. Moreover, the channel bits can be divided at the number of channel groups.

In this way, according to the sixth embodiment, the communication channels are divided into two groups when allocation information is notified with a channel of first order. Moreover, the allocation information of only that channel group which includes the allocated communication channel is transmitted. As a result, the transmittable bit count for allocation information is always maintained constant. That facilitates in reducing the amount of processing in the terminal that receives the allocation information as compared to the first embodiment.

Seventh Embodiment

FIG. 12 is a diagram of an exemplary configuration of a communication system according to a seventh embodiment of the present invention. In the seventh embodiment, description is given about an exemplary method of notifying channel allocation when virtual channels of third order are also used for notifying. Moreover, in FIG. 12, as an example of reducing the bit count for the channel unit notifying bit and the group bit, bit areas of the channel unit notifying bit and the group bit are not defined separately. Instead, a combined bit area sufficient for the channel unit notifying bit and the group bit is defined depending on the number of combinations of those two bits.

Allocation information 12-1 to 12-4 is notified with channels of first order, allocation information 12-5 and 12-6 is notified with virtual channels of second order, and allocation information 12-7 is notified with virtual channels of third order. A virtual channel of second order is defined as a combination of two consecutive communication channels, while a virtual channel of third order is defined as a combination of four consecutive communication channels. Herein, the bit count of channel bits that, from among the entire allocation information, correspond to allocated communication channels for the corresponding terminal is assumed to be identical irrespective of the order for a virtual channel unit. In the example shown in FIG. 12, the channel bits corresponding to the allocated communication channels are enclosed by full lines and their bit count is four.

In other words, when allocation information is notified with a channel of first order, a total of 16 communication channels are divided into four channel groups and allocation information corresponding to only one of the channel groups is transmitted to the corresponding terminal. More particularly, each of the allocation information 12-1, 12-2, 12-3, and 12-4 includes four channel groups and the allocation information corresponding to one of the channel groups is transmitted to the corresponding terminal. When allocation information is notified with virtual channels of second order, eight virtual channels of second order are defined from a total of 16 communication channels. The eight virtual channels of second order are further divided into two channel groups and allocation information corresponding to one of the two channel groups is transmitted to the corresponding terminal. More particularly, each of the allocation information 12-5 and 12-6 includes two channel groups, each including four virtual channels of second order, and the allocation information corresponding to one of the two channel groups is transmitted to the corresponding terminal. When allocation information is notified with virtual channels of third order, four virtual channels of third order are defined from a total of 16 communication channels. The four virtual channels of third order are represented as a single channel group. More particularly, the allocation information 12-7 includes a channel group having four virtual channels of third order and the allocation information of the entire channel group is transmitted to the corresponding terminal.

Meanwhile, three bits are sufficient to notify information about the order for virtual channel units (the first order, the second order, or the third order) and the channel group that includes the allocated communication channels. The allocation information notified with a channel of first order is segmented into four channel groups, the allocation information notified with virtual channels of second order is segmented into two channel groups, and the allocation information notified with a virtual channel of third order is notified as a single channel group. That is, a total of seven channel groups are present. Thus, the number of bits required to notify information about the seven channel groups is three. Those three bits are placed on the leftmost end in allocation information shown in FIG. 12. When a terminal receives allocation information, the leftmost bit of those three bits is used to determine whether the allocation information is notified with a channel of first order (leftmost bit=0) or is notified with either one of virtual channels of second order and a virtual channel of third order (leftmost bit=1). When the allocation information is notified with a channel of first order, the remaining two bits are used to determine the channel group that includes the allocated communication channel. When the allocation information is notified with either one of virtual channels of second order and a virtual channel of third order, the central bit is used to determine whether the allocation information is notified with virtual channels of second order (central bit=0) or with a virtual channel of third order (central bit=1). When the allocation information is notified with virtual channels of second order, the rightmost bit of those three bits is used to determine the channel group that includes the allocated communication channel. In the example shown in FIG. 12, the central bit of those three bits sometimes functions as a channel unit notifying bit and sometimes functions as a group bit. Meanwhile, the bit pattern shown in FIG. 12 is an exemplary bit pattern. Thus, it is possible to use other bit patterns as long as the order for virtual channel units and the allocated channel group are determinable. Moreover, although the highest order for virtual channel units according to the seventh embodiment is assumed to be the third order, the abovementioned notion can be implemented even in the case of a still higher order for virtual channel units.

In this way, according to the seventh embodiment, the bit count required to notify information about the order for virtual channel units and the channel group including the allocated communication channel is defined depending on the number of combinations of an order for virtual channel units and the number of channel groups with respect to that order of virtual channel units. Thus, as compared to a method of dividing information in separate bit areas, the required bit count decreases. That enables reduction in the volume of allocation information transmitted to a terminal in the form of a control signal. Moreover, the excess data volume can be used for data transmission.

In the above description, when it is necessary to use more than one communication channels for communication, channel allocation is performed by giving priority to consecutive communication channels. However, when unrestricted allocation of communication channels is desirable, it is also possible in the first to seventh embodiments to allow allocation of communication channels without taking into consideration their adjacency. In that case also, if the allocated communication channels are resultantly consecutive, then the present invention can be implemented. That is, even when allocation information is to be notified with channels of first order, there is a possibility that two or more communication channels are allocated to single terminal. In that case, the channel bit corresponding to each allocated communication channel can be set to "1". For example, in the allocation information 5-1 and 5-2 in FIG. 1, the channel bits corresponding to a plurality of communication channels can be set to "1" instead of setting only one channel bit corresponding to an allocated communication channel to "1".

Meanwhile, in the above description, it is assumed that channel allocation information is notified with virtual channels of highest possible order. However, if the highest order for a virtual channel unit is predetermined for a particular communication system, then it is also possible to use the predetermined order to notify channel allocation information in the first to seventh embodiments.

INDUSTRIAL APPLICABILITY

A method of notifying channel allocation according to the present invention is suitable in a communication system that performs communication by using a plurality of communication channels, and particularly suitable in a communication system that allocates a plurality of communication channels to a single terminal and notifies the communication channels to the terminal.

The invention claimed is:

1. A channel allocation notifying method with which a communication apparatus in a communication system allocates a communication channel to a terminal belonging to the communication apparatus and notifies the communication channel to the terminal, the channel allocation notifying method comprising:
   a number-of-channel calculating step of calculating number of communication channels necessary for a communication with the terminal by using type and volume of data to be transmitted;
   a channel allocating step including allocating a single communication channel to the terminal based on quality information of a communication line between the communication apparatus and the terminal when calculated number of communication channels is one, and allocating more than one communication channels to the terminal based on the quality information when the calculated number of communication channels is more than one; and
   an allocation information generating step including
      generating allocation information for notifying an allocated communication channel to the terminal based on a virtual channel that is set in advance as a unit of channel by combining a plurality of consecutive communication channels, and
      transmitting the allocation information to the terminal,
   wherein the allocation information includes
      a channel unit notifying bit that indicates a virtual channel order that is number of communication channels in a virtual channel, and
      a channel bit that indicates an allocation status of a communication channel in each virtual channel, and
   the allocation information generating step further includes
      determining, when a channel allocation is performed to all communication channels in a virtual channel, that the virtual channel is allocated with a communication channel, and
      setting a value indicating an allocation of a communication channel to the channel bit of the virtual channel.

2. A channel allocation notifying method with which a communication apparatus in a communication system allocates a communication channel to a terminal belonging to the communication apparatus and notifies the communication channel to the terminal, the channel allocation notifying method comprising:
- a number-of-channel calculating step of calculating number of communication channels necessary for a communication with the terminal by using type and volume of data to be transmitted;
- a channel allocating step including
  - allocating a single communication channel to the terminal based on quality information of a communication line between the communication apparatus and the terminal when calculated number of communication channels is one, and
  - allocating more than one communication channels to the terminal based on the quality information when the calculated number of communication channels is more than one; and
- an allocation information generating step including
  - generating allocation information for notifying an allocated communication channel to the terminal based on a virtual channel that is set in advance as a unit of channel by combining a plurality of consecutive communication channels, and
  - transmitting the allocation information to the terminal,
- wherein the allocation information includes
  - a notification type identification hit that indicates a notification type between a notification by a communication channel number and a notification by the virtual channel, and
  - a channel bit that indicates a value corresponding to a communication channel number when the notification type is the notification by the communication channel number, and an allocation status of a communication channel in each virtual channel when the notification type is the notification by the virtual channel, and
- the allocation information generating step further includes
  - setting the notification type identification hit based on the number of the communication channels allocated at the channel allocating step,
  - setting, when the notification type is the notification by the communication channel number, a value corresponding to the communication channel number as the channel bit,
  - determining, when the notification type is the notification by the virtual channel and when a channel allocation is performed to all communication channels in the virtual channel, that the virtual channel is allocated with a communication channel, and
  - setting a value indicating an allocation of a communication channel to the channel bit of the virtual channel.

3. A channel allocation notifying method with which a communication apparatus in a communication system allocates a communication channel to a terminal belonging to the communication apparatus and notifies the communication channel to the terminal, the channel allocation notifying method comprising:
- a number-of-channel calculating step of calculating number of communication channels necessary for a communication with the terminal by using type and volume of data to be transmitted;
- a channel allocating step including
  - allocating a single communication channel to the terminal based on quality information of a communication line between the communication apparatus and the terminal when calculated number of communication channels is one, and
  - allocating more than one communication channels to the terminal based on the quality information when the calculated number of communication channels is more than one; and
- an allocation information generating step including
  - generating allocation information for notifying an allocated communication channel to the terminal based on a virtual channel that is set in advance as a unit of channel by combining a plurality of consecutive communication channels, and
  - transmitting the allocation information to the terminal, setting the virtual channel by combining two consecutive communication channels,
- wherein the allocation information includes
  - an allocation channel count identification bit that indicates the number of communication channels allocated at the channel allocating step in each virtual channel,
  - a channel bit that indicates an allocation status of a communication channel in each virtual channel, and
  - a determining bit that indicates which of the two communication channels is allocated, and
- the allocation information generating step further includes
  - determining, when the number of communication channels allocated at the channel allocating step is one, that a virtual channel including the communication channel is allocated with a communication channel,
  - setting a value indicating an allocation of a communication channel to the channel bit of the virtual channel, and
  - setting a value indicating which of the communication channels is allocated to the determining bit.

4. The channel allocation notifying method according to claim 1, wherein
- the allocation information further includes an offset bit that indicates an amount of offset, and
- the allocation information generating step further includes shifting a communication channel corresponding to the channel bit by a number indicated by the offset bit.

5. The channel allocation notifying method according to claim 2, wherein
- the allocation information further includes an offset bit that indicates an amount of offset, and
- the allocation information generating step further includes shifting a communication channel corresponding to the channel bit by a number indicated by the offset bit.

6. The channel allocation notifying method according to claim 3, wherein
- the allocation information further includes an offset bit that indicates an amount of offset, and
- the allocation information generating step further includes shifting a communication channel corresponding to the channel bit by a number indicated by the offset bit.

7. The channel allocation notifying method according to claim 1, further comprising:
- fixing a bit count of the channel bit in the allocation information to a predetermined bit count, wherein
- the allocation information generating step further includes dividing, when the channel bit exceeds the predetermined bit count, the channel bit into the predetermined bit count, and
- generating the allocation information by adding a channel unit notifying bit to each divided channel bit.

8. The channel allocation notifying method according to claim 7, wherein
the allocation information generating step further includes
setting different transmission conditions in time, frequency, or space to allocation information units generated for each divided channel bit, and
transmitting allocation information including the communication channel allocated at the channel allocating step from among pieces of the allocation information to the terminal based on the transmission condition.

9. The channel allocation notifying method according to claim 1, further comprising:
dividing usable communication channels into channel groups each including a plurality of communication channels,
wherein the allocation information includes
a group bit for identifying the channel groups, and
a channel bit that indicates an allocation status of a communication channel in each virtual channel, and
the allocation information generating step further includes
generating, when the number of communication channels allocated at the channel allocating step is one, allocation information of a channel group including the communication channel.

10. The channel allocation notifying method according to claim 9, further comprising:
defining a bit count to be used for information regarding the channel unit and the channel group based on a combination of number of channel units and number of channel groups.

11. A communication method between a communication apparatus in a communication system and a terminal belonging to the communication apparatus when the communication apparatus allocates a communication channel to the terminal and notifies the communication channel to the terminal, the communication method comprising:
a number-of-channel calculating step including the communication apparatus calculating number of communication channels necessary for a communication with the terminal by using type and volume of data to be transmitted;
a channel allocating step including the communication apparatus allocating a single communication channel to the terminal based on quality information of a communication line between the communication apparatus and the terminal when calculated number of communication channels is one, and the communication apparatus allocating more than one communication channels to the terminal based on the quality information when the calculated number of communication channels is more than one;
an allocation information generating step including the communication apparatus generating allocation information for notifying an allocated communication channel to the terminal based on a virtual channel that is set in advance as a unit of channel by combining a plurality of consecutive communication channels, and the communication apparatus transmitting the allocation information to the terminal; and
an allocated channel calculating step including the terminal obtaining a communication channel allocated to the terminal by performing a reverse procedure to an allocation information generating process on received allocation information.

12. A communication apparatus that builds a communication system with a terminal belonging to the communication apparatus, the communication apparatus allocating a communication channel to the terminal, the communication apparatus comprising:
a channel allocating unit that calculates number of communication channels necessary for a communication with the terminal by using type and volume of data to be transmitted, when calculated number of communication channels is one, allocates a single communication channel to the terminal based on quality information of a communication line between the communication apparatus and the terminal, and when the calculated number of communication channels is more than one, allocates more than one communication channels to the terminal based on the quality information; and
an allocation information generating unit that generates allocation information for notifying an allocated communication channel to the terminal based on a virtual channel that is set in advance as a unit of channel by combining a plurality of consecutive communication channels.

* * * * *